United States Patent [19]

Villaine et al.

[11] Patent Number: 4,839,113

[45] Date of Patent: Jun. 13, 1989

[54] ANISTROPIC COMPOSITIONS OF CELLULOSE ESTERS; PROCESSES FOR OBTAINING SUCH COMPOSITIONS; FIBERS OF CELLULOSE ESTERS OR CELLULOSE

[75] Inventors: Philippe Villaine, Dübendorf, Switzerland; Claude Janin, Riom, France

[73] Assignee: Michelin Recherche et Technique S.A., Basel, Switzerland

[21] Appl. No.: 822,419

[22] PCT Filed: Apr. 24, 1985

[86] PCT No.: PCT/CH85/00065

§ 371 Date: Dec. 19, 1985

§ 102(e) Date: Dec. 19, 1985

[87] PCT Pub. No.: WO85/05115

PCT Pub. Date: Nov. 21, 1985

[30] Foreign Application Priority Data

Apr. 27, 1984 [FR] France ............... 84 06912

[51] Int. Cl.⁴ ............... C08L 1/10; D01F 2/28
[52] U.S. Cl. ............... 264/28; 264/187; 264/203; 264/207; 264/211.11; 264/211.13; 264/211.14; 264/211.15; 264/211.16; 264/211.18; 264/211,19; 106/163.1; 106/168; 106/169; 106/177; 106/198; 428/393; 536/62; 536/67
[58] Field of Search ............... 536/57, 69, 76, 82, 536/62, 67; 264/178 F, 203, 176 F, 187, 207, 210.8, 211.11, 28, 211.13, 211.14, 211.15, 211.19, 211.16, 211.18; 428/393; 106/168, 163.1, 169, 177, 196, 197.1, 198

[56] References Cited

U.S. PATENT DOCUMENTS

| 1,656,119 | 1/1928 | Jurling . | |
|---|---|---|---|
| 1,900,599 | 3/1933 | Elöd . | |
| 2,053,123 | 9/1936 | Alles | 152/556 |
| 2,147,736 | 2/1939 | Dreyfus | 428/259 |
| 2,363,091 | 11/1944 | Seymour et al. . | |
| 3,168,409 | 2/1965 | Wellisch | 106/168 |
| 3,442,315 | 5/1969 | Mirtain | 152/556 |
| 3,498,355 | 3/1970 | Sperberg | 152/556 |
| 4,370,168 | 1/1983 | Kamide et al. | 106/177 |
| 4,464,323 | 8/1984 | O'Brien | 536/57 |
| 4,486,119 | 12/1984 | Kamide et al. | 106/177 |
| 4,501,886 | 2/1985 | O'Brien | 264/187 |

FOREIGN PATENT DOCUMENTS

| 0103398 | 3/1984 | European Pat. Off. . |
| 2340344 | 2/1977 | France . |
| 309 | of 1911 | United Kingdom . |
| 29246 | of 1911 | United Kingdom . |
| 0260650 | 11/1926 | United Kingdom . |
| 0263810 | 12/1926 | United Kingdom . |
| 0275641 | 1/1929 | United Kingdom . |

*Primary Examiner*—Hubert Lorin
*Attorney, Agent, or Firm*—Brumbaugh, Graves, Donohue & Raymond

[57] ABSTRACT

Composition (M) having a base of a cellulose ester having formate groups, this composition being an anisotropic solution containing:
(a) the cellulose ester;
(b) formic acid;
(c) at least one phosphoric acid.

A process for obtaining this composition by dissolving the cellulose and a process for obtaining articles by transformation of this composition, and, for example, regenerating the cellulose of these articles. A cellulose fiber is provided in which a degree of substitution of the cellulose by formate groups is either at least equal to 2% or is zero or less than 2%.

24 Claims, 8 Drawing Sheets

ANISTROPIC COMPOSITIONS OF CELLULOSE ESTERS; PROCESSES FOR OBTAINING SUCH COMPOSITIONS; FIBERS OF CELLULOSE ESTERS OR CELLULOSE

BACKGROUND OF THE INVENTION

The present invention concerns cellulose materials. By "Cellulose material" there are understood either plant materials containing both cellulose and other products, for example lignin, or cellulose obtained by any process, in particular processes based on plant materials.

The invention concerns in particular an anisotropic composition having a base of at least one cellulose derivative comprising ester groups of cellulose, at least a part of these ester groups being formate groups. The invention also concerns articles obtained from this composition, the cellulose formate of which articles can be regenerated to cellulose. The invention also concerns processes which make it possible to obtain these compositions and articles, as well as articles of high mechanical properties, these articles having a base of cellulose and/or at least one cellulose derivative as previously defined. Such articles may, for instance, be fibers or films.

German Pat. Nos. 189 836, 189 837 and 561 119, French Pat. Nos. 638 431 and 541 048, British Pat. Nos. 260 650 and 275 641 and U.S. Pat. Nos. 1,656,119 and 1,900,599 describe processes for transforming cellulose into cellulose formate by the action of formic acid in the presence of various inorganic compounds which may, in particular, by hydrochloric acid, sulfuric acid or phosphoric anhydride. The processes described in said patents lead to at least one of the following drawbacks:

impossibility of obtaining a solution of cellulose formate;

extensive degradation of the cellulose upon the esterification reaction or storage, particularly when the temperature becomes greater than 0° C., the cellulose formate having a degree of polymerization which is definitely less than that of cellulose before esterification;

impossibility of obtaining articles of high mechanical properties.

U.S. Pat. No. 2,363,091 describes the production of mixed formate-acetate esters of cellulose by the action of mixed formic-acetic anhydride on cellulose in the presence of a catalyst, which may, for instance, be phosphoric acid or phosphoric anhydride, the amount of this catalyst not exceeding 30% of the weight of the cellulose. The process described in said patent does not make it possible to obtain dissolution of the cellulose.

German Pat. No. 227 198 describes the dissolving of cellulose by the action of acetic acid and phosphoric acid. This patent does not mention the production of a solution of cellulose formate. Furthermore, the process described does not make it possible to obtain cellulose acetate concentrations sufficient to obtain anisotropic solutions.

British Pat. No. 263 810 describes the dissolving of cellulose by the action of phosphoric acid and an organic acid, which may be acetic acid, propionic acid or butyric acid. This patent does not describe the production of a solution of cellulose formate. Furthermore, the concentration of the cellulose esters in the solutions described in said patent is not sufficient to obtain anisotropic solutions.

British Pat. Nos. 309 (1911) and 29246 (1910) as well as Swiss Pat. No. 56146 and German Pat. No. 249535 describe processes in which cellulose is contacted with a mixture of concentrated formic acid and phosphoric acid. The examples described in these patents show that a cellulose solution is not obtained or that an isotropic solution is obtained.

German patent application OS No. 3 035 084 describes the production of anisotropic solutions by dissolving cellulose esters in aqueous solutionsof inorganic acids. This process does not apply to cellulose formate. Moreover, this process is expensive since it uses cellulose esters and not cellulose as raw material. Furthermore, these cellulose esters, in general, have a substantially lower degree of polymerization than the cellulose used to obtain them. It may be added that the mechanical properties of the articles described in said application and produced from these esters are low. Finally, this application does not describe any regeneration of the cellulose from the cellulose ester solutions; moreover, such a regeneration would be very slow with the solutions described and practically impossible to carry out continuously.

SUMMARY OF THE INVENTION

The object of the present invention is to avoid these drawbacks.

Accordingly, the invention concerns a composition having a base of at least one cellulose derivative containing cellulose ester groups, at leat a part of these ester groups being formate groups, this composition being characterized by the fact that it is an anisotropic solution which can give fibers or films and contains:

(a) the cellulose derivative or derivatives, the concentration of the cellulose derivative or of all of the cellulose derivatives in the solution being at least equal to 10.2% by weight and the degree of polymerization DP of the cellulose in the cellulose derivative or derivatives being greater than 150 and less than 1500;

(b) formic acid or at least two compounds selected from the group consisting of monocarboxylic organic acids and the anhydrides and halides of these acids, one of these compounds being formic acid;

(c) at least one phosphoric acid.

The invention also concerns a process of obtaining this composition by dissolution of the cellulose, which dissolution can be affected without substantially decreasing the degree of polymerization of the cellulose.

This process, known as the "dissolution process," is characterized by the following features:

(a) mixture is formed from at least three materials, namely:

(I) a cellulose material;

(II) a material consisting of at least one compound selected from the group consisting of monocarboxylic organic acids and the anhydrides and halides of these acids, this material consisting at least in part of formic acid and/or an anhydride of formic acid and another organic acid;

(III) a material consisting of phosphoric anhydride or at least one phosphoric acid, or of phosphoric anhydride and at least one phosphoric acid;

(b) the amount of water present to form the mixture is zero or such that the ratio $$R_{wr} = \frac{P_w - P_{wr}}{P_I + P_{II} + P_{III} + P_w - P_{wr}}$$

is less than 15.0% and greater than $-7.5\%$, $R_{wr}$ being expressed in percentage (%), $P_w$ being the weight of the water possibly present, $P_{wr}$ being the weight of water capable of possibly reacting with material (II) and/or material (III), $P_I$ being the weight of cellulose in material (I), $P_{II}$ being the weight of material (II) and $P_{III}$ being the weight of material (III);

(c) the ratios $R_I$, $R_{II}$, $R_{III}$ being defined by:

$$R_I = \frac{P_I}{P_I + P_{II} + P_{III} + P_w - P_{wr}},$$

$$R_{II} = \frac{P_{II}}{P_I + P_{II} + P_{III} + P_w - P_{wr}},$$

$$R_{III} = \frac{P_{III}}{P_I + P_{II} + P_{III} + P_w - P_{wr}},$$

the ratios $R_I$, $R_{II}$, $R_{III}$, $R_{wr}$, the sum of which $R_I + R_{II} + R_{III} + R_{wr}$ is equal by definition to 100%, will verify the following relationships the values of which are expressed in %:

if $R_{wr}$ verifies the relationship:
$12.5 \leq R_{wr} < 15.0$
one has the relationships: $10.0 \leq R_1 \leq 14.5$; $2.0 \leq R_{II} \leq 10.0$
with the relationship: $R_{II} \leq 0.89 R_I - 2.89$;
if $R_{wr}$ verifies the relationship:
$10.0 \leq R_{wr} < 12.5$
one has the relationships; $10.0 \leq R_I \leq 19.5$; $2.0 \leq R_{II} \leq 17.0$
with the relationship: $R_{II} \leq 1.78 R_I - 8.78$ if $R_I$ verifies the relationship: $R_I < 14.5$
or with the relationship: $R_{II} \leq -1.40 R_I + 37.30$ if $R_I$ verifies the relationship: $R_I \geq 14.5$;
if $R_{wr}$ verifies the relationship:
$7.5 \leq R_{wr} < 10.0$
one has the relationships: $10.0 \leq R_I \leq 31.0$; $2.0 \leq R_{II} \leq 23.0$
with the relationship: $R_{II} \leq 4.40 R_I - 32.00$ if $R_I$ verifies the relationship $R_I \leq 12.5$,
or with the relationship: $R_{II} \leq = 1.19 R_I + 41.50$ if $R_I$ verifies the relationship: $R_I \geq 15.5$;
if $R_{wr}$ verifies the relationship:
$5.0 \leq R_{wr} < 7.5$
one has the relationships: $10.0 \leq R_I \leq 37.0$; $2.0 \leq R_{II} \leq 27.5$
with the relationship: $R_{11} \leq 4.17 R_I - 26.67$ if $R_I$ verifies the relationship: $R_I \leq 13.0$,
or with the relationship: $R_{II} \leq -1.14 R_I + 49.14$ if $R_I$ verifies the relationship: $R_I \geq 19.0$;
if $R_{wr}$ verifies the relationship:
$2.5 \leq R_{wr} < 5.0$
one has the relationships: $10.0 \leq R_I \leq 37.0$; $2.0 \leq R_{II} \leq 36.5$
with the relationship: $R_{II} \leq 4.63 R_I - 28.25$ if $R_I$ verifies the relationship: $R_I \leq 14.0$,
or with the relationship: $R_{II} \leq -1.23 R_I + 55.60$ if $R_I$ verifies the relationship: $R_I \geq 15.5$;
if $R_{wr}$ verifies the relationship:
$-2.5 < R_{wr} < 2.5$
one has the relationships: $10.0 \leq R_I \leq 38.0$; $2.0 \leq R_{II} \leq 40.0$ with the relationship: $R_{II} \leq 2.80 R_I + 5.00$ if $R_I$ verifies the relationship: $R_I \leq 12.5$,
or with the relationship: $R_{II} \leq -1.14 R_I + 62.14$ if $R_I$ verifies the relationship: $R_I \geq 19.5$;
if $R_{wr}$ verifies the relationship:
$-5.0 < R_{wr} \leq -2.5$
one has the relationships: $10.0 \leq R_I \leq 35.0$; $2.0 \leq R_{II} \leq 45.0$
with the relationship: $R_{II} \leq -1.30 R_I + 64.50$;
if $R_{wr}$ verifies the relationship:
$-7.5 < R_{wr} \leq -5.0$
one has the relationships: $10.0 \leq R_I \leq 32.0$; $2.0 \leq R_{II} \leq 36.0$
with the relationship: $R_{II} \leq 4.00 R_I - 22.00$ if $R_I$ verifies the relationship: $R_I \leq 14.5$;

(d) the degree of polymerization DP of the cellulose of material (I) is greater than 150 and less than 1500;

(e) the esterification of the cellulose is allowed to proceed in this mixture for a period of time sufficient to obtain the anisotropic solution.

The invention also concerns the compositions obtained by this dissolution process.

The invention also concerns a process for obtaining articles having a base of at least one cellulose derivative, characterized by the fact that the composition according to the invention is transformed into articles and that at least a part of the products other than the cellulose derivative or derivatives is eliminated from the articles.

The invention also concerns a process for obtaining articles having a base of regenerated cellulose which is characterized by a least partly regenerating the cellulose of the articles obtained with the preceding process.

The invention also concerns the articles obtained according to these processes.

The invention also concerns a fiber formed, at least in part, of a filament having a base of at least one cellulose derivative containing cellulose ester groups, at least a part of these ester groups being formate groups, characterized by the fact that it has the following properties:

(a) the degree of substitution DS of the cellulose by formate groups is at least equal to 2% and the degree of polymerization DP of the cellulose is greater than 150 and less than 1500;

(b) the tenacity T and the initial modulus $M_i$ of the fiber verify the following relationships, T and $M_i$ being expressed in cN/tex:

$T > 20; M_i > 1000;$ (c) this filament has a morphology such that it is formed at least in part by layers embedded in each other, these layers surrounding the axis of the filament, and such that in each layer the optical direction and the direction of crystallization vary pseudoperiodically along the axis of the filament.

The invention also concerns a fiber, called "regenerated cellulose fiber," formed at least in part of a filament having a base of cellulose and/or of at least one cellulose derivative containing cellulose ester groups, at least a part of these ester groups being formate groups, charaterized by the fact that it has the following properties:

(a) the degree of substitution DS of the cellulose by formate groups is zero or less than 2% and the degree of polymerization DP of the cellulose is more than 150 and less than 1500;

(b) the degree of polymerization DP of the cellulose, the tenacity T and the initial modulus $M_i$ of the fiber verify the following relationships, T and $M_i$ being expressed in cN/tex:

For DP<200, one has T>20 and $M_i$>1800;
for 200≦DP<300, one has T>30 and $M_i$>2000;
for 300≦DP<400, one has T>40 and $M_i$>2400;
for 400≦DP<1500, one has T>60 and $M_i$>2600;

(c) this filament has a morphology such that it is formed at least in part by layers embedded in each other, these layers surrounding the axis of the filament, and such that in each layer the optical direction and the direction of crystallization vary pseudoperiodically along the axis of the filament.

The weights $P_I$, $P_{II}$, $P_{III}$ are weights of the cellulose and materials (II), (III) assumed anhydrous, that is to say, these weights are determined by deducting the weight of any water present in one or more of materials (I), (II), (III) at the time of the preparation of the mixture. The weight $P_w$ is the weight of any water introduced at the time of the preparation of the mixture with at least one of materials (I), (II), (III) and/or independently of these materials.

The expression "cellulose," which is used for simplicity of description, designates "holocellulose," that is to say the total of the α-cellulose and the hemicelluloses present in the cellulose material, this cellulose material being possibly without hemicellulose.

The monocarboxylic organic acids possibly used for material (II) at the same time as the formic acid and/or at least one mixed anhydride of formic acid are in particular the non-aromatic acids whose number of carbon atoms varies from 2 to 5, such as, for instance, acetic acid, propionic acid, butyric acid and pentanoic acid. The anhydrides of the monocarboxylic acids possibly used for material (II) may, in particular, be anhydrides of the abovementioned acids, and the anhydrides may, for instance, be mixed anhydrides, in particular mixed anhydrides of formic acid. The halides of monocarboxylic acids possibly used for material (II) are in particular chlorides. The invention covers the case that these organic acids and anhydrides and halides of organic acids contain substitution groups, for instance halogen groups or alkyl groups.

The compounds used for material (III) in accordance with the invention are, in particular, phosphoric acids such as orthophosphoric acid ($H_3PO_4$), pyrophosphoric acid ($H_4P_2O_7$), phosphoric anhydride ($P_2O_5$) or mixtures of these compounds with each other or with other phosphoric acids such as polyphosphoric acids as defined in the book "Nouveau traité de chimie minérale" published under the editorship of Paul Pascal, Volume X, Masson Editeur 1956.

The ratios previously defined $R_I$, $R_{II}$, $R_{III}$, $R_{wr}$ will be explained subsequently in greater detail in the examples. When material (II) and/or material (III) are capable of reacting with water, $P_{wr}$ has a value other than zero. Otherwise, $P_{wr}$ has a value of zero.

For the preparation of the mixture, materials (I), (II), (III) and the water possibly used may be mixed at the same time or one may prepare at least one premixture which is then mixed with the rest of the materials, for instance a premixture of materials (II) and (III).

The expressions "anisotropic composition" and "isotropic composition" used in the specification have the following meaning.

An anisotropic composition presents optical anisotropy, that is to say that this composition in relaxed state, and therefore without dynamic stress, depolarizes light and presents transmission of light and a homogeneous color texture when it is placed between a glass slide and a cover glass at room temperature and when it is observed through a microscope between crossed linear polarizers. In an isotropic composition, on the other hand, the field of the microscope is black. In general, this anisotropic composition is such that its concentration is greater than the critical concentration determined on the curve representing the relationship between the viscosity of the composition and the concentration of the cellulose derivative or derivatives in the composition. On such a curve, the viscosity of the composition increases when the concentration of the cellulose derivative or derivatives increases, this taking place up to the critical concentration, at times referred to as the "critical point," where the curve shows a substantial change in its slope. When the concentration exceeds the critical concentration, the viscosity of the composition starts to decrease or increases less rapidly upon an increase in concentration of the cellulose derivative or derivatives, as can be noted, in particular, by a maximum or a point of inflection in the curve. The composition is, in general, called "anisotropic" when its concentration of cellulose derivative or derivatives is greater than the critical concentration. Such a curve which shows the relationship between the viscosity and the concentration of the composition will be studied further below. in all of the present specification the expression "viscosity" refers to dynamic viscosity.

The invention will be readily understood on basis of the non-limitative examples which follow and the completely diagrammatic figures relating to said examples.

BRIEF DESCRIPTION OF THE DRAWINGS

In the drawing.

each of FIGS. 1 and 2 shows a ternary diagram illustrating conditions of application of the dissolution process of the invention.

DESCRIPTION OF THE PREFERRED EMBODIMENT

Figure 1:
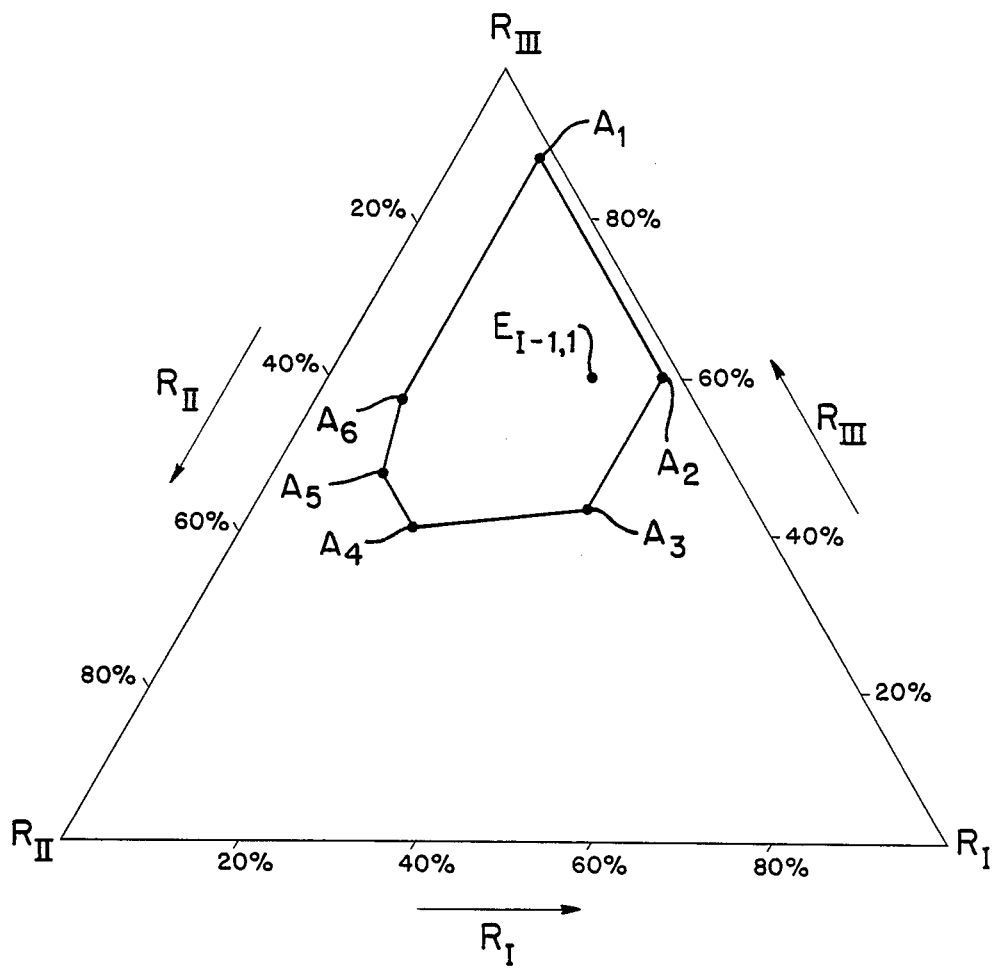

For clarity in the description the examples which follow are classified in three chapters:

I. Cellulose compositions: This chapter describes tests showing the preparation of these compositions as well as the compositions obtained.

II. Articles of cellulose derivatives: This chapter describes tests showing the production of these articles as well as the articles obtained.

III. Articles of regenerated cellulose: This chapter describes tests showing the production of these articles as well as the articles obtained.

The tests described in these examples may either be tests in accord with the invention or tests not in accord with the invention which are given by way of comparison.

I. CELLULOSE COMPOSITIONS

A. Cellulose Materials

Eight cellulose materials are used. These cellulose materials are referenced C1 to C8 and their characteristics are given in Table 1.

The percentages indicated in this table are percentages by weight referred to the total weight of the cellulose material. The water content corresponds to the residual humidity. The characteristics of this table are determined in the following manner:

(a) Content of α-cellulose: This is determined in accordance with Federal Republic of Germany Standard DIN 54 355 of November 1977. This content corresponds to the portion of cellulose material which is insoluble in an aqueous caustic soda solution of 18% by weight.

(b) Content of hemicelluloses: This value is obtained by the following calculation: (% hemicelluloses)=100−(% α-cellulose)−(% resin)−(% water)−(% ash).

(c) Content of holocellulose; As defined previously, the holocellulose content is obtained by calculation in accordance with the equation (% holocellulose)=(% α-cellulose)+(% hemicelluloses).

(d) Content of resins: This content is determined in accord with Federal Republic of Germany Standard DIN 54 354 of November 1977, that is to say in accord with a dichloromethane extraction method.

(e) Content of ash: The ash content is measured by a thermogravimetric method. The apparatus used is a Mettler thermobalance of type TG 50, equipped with a Mettler TC 10 microprocessor. The temperature first increases gradually from room temperature up to 950° C. with, initially, a stream of nitrogen and then, starting at 700° C., with a stream of air, the rate of heating being 20° C. per minute. The sample is cooled to room temperature and then weighed.

(f) Water content (residual humidity): This is measured by a thermogravimetric method under nitrogen with the same apparatus as described under Section (e) above for the determination of the ash content, the temperature increasing gradually from room temperature up to 150° C. with a rate of heating of 20° C. per minute. The sample is maintained for 15 minutes at 150° C. and then cooled and weighed.

(g) Degree of polymerization DP: The inherent viscosity IV of the cellulose material is determined in accord with Swiss Standard SNV 195 598 of 1970, but at different concentrations, varying between 0.5 and 0.05 g/dl.

The inherent viscosity is determined by the equation $$IV = \frac{1}{C} \ln \frac{t}{t_o}$$

in which C represents the concentration of dry cellulose material, "t" represents the flow time of the dilute polymer solution, $t_o$ represents the flow time of the pure solvent in an Ubbelohde-type viscosimeter and Ln represents the Napierian logarithm, the measurements being effected at 20° C.

The intrinsic [η] is obtained by extrapolating the inherent viscosity IV to zero concentration.

The weight average molecular weight $\overline{M}_w$ is given by the Mark-Houwink equation: $[\eta] = K M_w^{60}$ where the constants K and α are $K = 5.31 \times 10^{-4}$ and $\alpha = 0.78$, these constants corresponding to the solvent system used for the determination of the inherent viscosity.

These values are given by L. Valtasaari in Tappi 48, 627 (1965).

The degree of polymerization (DP) is defined by the formula $$DP = \frac{\overline{M}_w}{162}$$

in which 162 is the molecular weight of the elementary unit of the cellulose.

(h) pH of the pulp: Measured in accordance with Federal Republic of Germany Standard DIN 53 124 of December 1960.

B. Apparatus and Method for Producing the Compositions

The compositions are produced in a cylindrical glass reactor. The interior volume of this reactor is about 50 ml and its inside diameter about 20 mm. This reactor is provided with a thermostatted outer jacket so that the temperature of the products within the reactor is maintained at 25° C. Agitation is effected in the reactor by means of two metal spirals one of which is fixed while the other turns around the axis of the cylinder of the reactor at a speed of about 15 to 20 rpm, the movable spiral being further from the axis than the fixed spiral. The agitation thus covers the entire inner volume of the reactor. For simplification in description, all the materials used to prepare the mixtures, including the water if any, are referred to as "base materials."

For each test the base materials are first of all kneaded together in a mortar so as to obtain a paste, which is then introduced into the cylindrical reactor. Agitation is then further effected in the reactor in order to promote the esterification of the cellulose. Samples of the mixture are taken at intervals in order to examine them under the microscope and the agitation is stopped when a solution has formed. The agitation is stopped in any event at the end of 8 hours, whether or not a solution has formed.

The final mixture is referred to as "composition" at the end of the agitation.

C. Examples of Test on the Preparation of Compositions

1. General Remarks

The following examples consist of tests each of which describes the preparation of a mixture and the study of the composition obtained, which may be either in accord with the invention or not in accord with the invention. These tests are shown in detail in Tables 4 to 14, which tables are summarized in Table 2. Each mixture is prepared by mixing four base materials, which are water and the following materials (I), (II), (III):

(I) A cellulose material selected from among the materials described in Section A above. This material may be dried before use in order to at least partially remove the water from it.

(II) A material consisting of at least one of the following products: organic acid, anhydride of organic acid(s), chloride of organic acid.

(III) A material consisting of at least one of the following products: Inorganic acid, inorganic acid anhydride, organic acid.

When a test is in accord with the invention, materials (II) and (III) are in accord with materials (II) and (III) respectively defined above in the dissolution process of the invention.

The water can be introduced into the mixture with at least one of materials (I), (II), (III), for instance by using aqueous orthophosphoric acid, and/or independently of these materials.

The mixtures are prepared with the apparatus and the method described in Section B above.

For the preparation of each mixture the following ratios are defined:

$$R_I = \frac{P_I}{P_I + P_{II} + P_{III} + P_w - P_{wr}};$$

$$R_{II} = \frac{P_{II}}{P_I + P_{II} + P_{III} + P_w - P_{wr}};$$

$$R_{III} = \frac{P_{III}}{P_I + P_{II} + P_{III} + P_w - P_{wr}};$$

$$R_{wr} = \frac{P_w - P_{wr}}{P_I + P_{II} + P_{III} + P_w - P_{wr}}.$$

We have $R_I + R_{II} + R_{III} + R_{wr} = 1$.

In these ratios, $P_I$ represents the weight of holocellulose in material (I), $P_{II}$ represents the weight of material (II), $P_{III}$ represents the weight of material (III), $P_w$ represents the weight of water, $P_{wr}$ represents the weight of water capable of reacting with material (II) and/or material (III). The weights $P_I$, $P_{II}$, $P_{III}$ are weights of anhydrous material, that is to say they are calculated with disregard of the water which is already in contact with materials (I), (II) or (III) before the preparation of the mixture, this water being accounted for in the weight $P_w$. Thus, for instance, if a test is carried out by mixing one of the cellulose materials $C_1$ to $C_8$ with an aqueous solution of formic acid and with an aqueous solution of orthophosphoric acid, $P_I$ represents the weight of anhydrous holocellulose, $P_{II}$ represents the weight of anhydrous formic acid, $P_{III}$ represents the weight of anhydrous orthophosphoric acid and $P_w$ represents the sum of the weight of water present in the cellulose material, after possible drying, and the weights of water present in the formic acid and orthophosphoric acid solutions.

The water possibly introduced by the surrounding air is not taken into account in the weight $P_w$. It goes without saying that the water liberated by the esterification of the cellulose upon the tests is not included in the weight $P_w$. When the test is in accord with the invention, the ratios $R_I$, $R_{II}$, $R_{III}$, $R_{wr}$ are in accord with the ratios previously indicated in the definition given for the dissolution process according to the invention.

The weight $P_{wr}$ is the theoretical total weight of water capable of reacting with material (II) and/or material (III). Thus, in general, in the case of the method of dissolution in accord with the invention, the water is capable of reacting with material (II) when this material contains at least one anhydride of organic acid(s) and/or at least one organic acid halide, and the water is capable of reacting with material (III) when said material contains phosphoric anhydride and/or at least one phosphoric acid other than orthophosphoric acid.

If none of materials (II), (III) can react with water, $P_{wr}$ has a value of zero.

In such case, $$R_{wr} = R_w = \frac{P_w}{P_I + P_{II} + P_{III} + P_w}.$$

When $P_{wr}$ is equal to or greater than $P_w$, $R_{wr}$ is zero or negative, that is to say the entire weight of water $P_w$ is capable of reacting with materials (II) and/or (III). In accord with the invention, $R_{wr}$ is less than 15% and greater than −7.5%.

2. Measurements and Observations Effected on the Compositions Obtained

The measurements and observations made on the compositions obtained upon the tests are as follows:

(a) Solubility: A drop coming from the cylindrical reactor is observed by means of an Olympus optical microscope type BH2 having a magnification of 100. By definition:

a solution of the cellulose is obtained when no solid particle of cellulose is visible;

there is insolubility of the cellulose when solid particles of cellulose are visible.

This examination is carried out at regular intervals during each test. In the examples which follow, in the case of the tests leading to a solution, the agitation time indicated in Tables 4 to 14 corresponds to the agitation time of the cylindrical reactor at the end of which said test shows the formation of a solution. The agitation is then stopped for this test. In any event, the agitation of this reactor is stopped at the end of eight hours.

(b) Optical isotropy or anisotropy of the solutions: This observation is effected only on the solutions. A drop of solution is placed between crossed polarizers and analyzers of an Olympus optical polarization microscope of type BH2 and then observed.

(c) Degree of substitution (DS) of the cellulose in solution in the form of cellulose derivative. The solution is frozen in liquid nitrogen, the solid product obtained is mixed with dry ice and crushed so as to obtain a powder which is mixed with acetone, which gives a precipitate which is filtered and extracted with acetone, using a Soxlhet extractor. The remaining powder is dried in air at 70° C. for at least 30 minutes.

400 mg of derivative of the cellulose thus obtained is weighed out accurately and introduced into an Erlenmeyer containing 70 ml of water and 4 ml of normal sodium hydroxide (1N NaOH). It is refluxed at 100° C. for one-half hour under nitrogen and the cellulose of the cellulose derivative is thus regenerated. After cooling, the excess sodium hydroxide is back-titrated with a decinormal solution of hydrochloric acid (0.1N HCl).

The total DS obtained by this method gives the total percentage of alcohol groups of the cellulose which have been esterified, that is to say DS=100% when the three alcohol functions of the elementary unit of the cellulose are esterified.

When all the ester groups of this cellulose derivative are formate groups, the DS thus determined gives directly the percentage of alcohol groups in the cellulose which have been transformed into formate groups. When the cellulose derivative contains several ester groups, for instance formate groups and acetate groups, in order to distinguish the degrees of substitution relative to each organic acid one proceeds in the following manner, after having determined the total DS in the manner previously described. The neutral solution coming from the determination of the total DS is made basic (pH=11) so as to precipitate the cellulose thus regenerated. This cellulose is filtered. The filtrate is concentrated by evaporation of the water and then acidified with hydrochloric acid. This residue is weighed and then analyzed by gaseous-phase chromatography in order to determine the content of organic acid other than formic acid therein. By way of example, in the case of acetic acid, the conditions for gaseous phase chromatographic analysis are as follows: glass column: length 1.5 m, inside diameter 2 mm; packing: Poropak Q; apparatus: Pye Unicam; temperature of the injector: 250° C.; temperature of the furnace: 140° C.; temperature of the FID detector: 220° C. One thus determines the DS relative to the organic acid other than formic acid and the DS relative to the formic acid is then determined by calculation, based on a knowledge of the total DS.

(d) Degree of polymerization (DP) of the cellulose in solution in the form of cellulose derivative. The cellulose derivative is isolated and the cellulose of this derivative is then regenerated by treating this derivative under reflux with normal sodium hydroxide, these two operations being identical to those described in Section (c) above. The cellulose obtained is washed with water, dried and the DP measured in the manner described previously under Section A.g).

In addition to the DP values for the esterified cellulose, the tables of the examples which follow indicate also the variation of DP ($\Delta$DP) with respect to the DP of the initial cellulose (DP given in Table 1 for the cellulose material used for the corresponding test). This $\Delta$DP is expressed in absolute value and in percentage relative to the DP of the initial cellulose.

(e) Constitution of the compositions: This constitution is determined by calculation from the DS measured in the cellulose derivatives and from the respective proportions of the base materials.

Table 2 below gives a summary of the conditions of each example. The asterisks appearing in this table after certain example numbers mean that the corresponding examples are in accord with the invention, the others not being in accord with the invention. In detailed Tables 4 to 14 concerning these examples, the following abbreviations are used:

"Solubility" line: "SL" means "soluble" and "INSL" means "insoluble";

"Nature of the solution" line: "IS" means "isotropic" and "ANIS" means anisotropic.

In these detailed tables the constitution of the composition obtained (% by weight) is given only if this composition is a solution.

In Tables 4 to 14 there are entered the data concerning the base materials, the agitation times and the compositions obtained. In addition to the ratios and abbreviations previously defined, these tables may contain the following abbreviations:

Agitation time: time of agitation of the mixture,
  Der. cel.: cellulose derivative present in the composition,
  Ac. org.: organic acid(s) present in the composition,
  Ac. min.: inorganic acid or acids present in the composition,
  Nat. sol.: nature of the solution (that is to say, isotropic or anisotropic),
  DS cel.: degree of substitution of the cellulose of the cellulose derivative present in the composition,
  Gr.: groups (for instance formate groups),
  DP cel.: degree of polymerization of the cellulose of the cellulose derivative present in the composition,
  val. abs.: absolute value.

The percentages entered for each of the indications Der. cel., Ac. org., Ac. min., refer to the percentage of the compound or total of the compounds corresponding to this indication referred to the total weight of the constituents of the solution indicated in the tables, that is to say, for instance, in the case of the solutions of Tables 4 to 14, referred to the total weight of cellulose derivative plus organic acid(s) plus inorganic acid (or inorganic acids) plus water, if any.

In Tables 4 to 14, the values of the ratios $R_I$, $R_{II}$, $R_{III}$, $R_{wr}$ and $R_w$ are expressed in percent, that is to say the figures indicated in the lines corresponding to these ratios may also be considered parts by weight, taking the sum $P_I+P_{II}+P_{III}+P_w-P_{wr}$ being equal to 100 parts by weight. Thus, for instance, in the case of Test No. 1 of Example I-1 (Table 4), one uses $P_I=29.8$ parts by weight of holocellulose, $P_{II}=9.9$ parts by weight of formic acid, $P_{III}=59.7$ parts by weight of orthophosphoric acid, $P_w=0.6$ part by weight of water, with $P_I+P_{II}+P_{III}+P_w=100$, $P_{wr}$ being equal to zero, that is to say $R_{wr}$ being equal to $R_w$ and to 0.6%, that is to say 0.006, the value of $R_w$ expressed in percent being equal to 0.6.

When the Remarks of Tables 4 to 14 contain weight ratios other than $R_{wr}$, they are weight ratios of anhydrous products.

A list of the products used in the Examples for materials (II) and (III) together with their water content is given in Table 3.

TABLE 1

| Composition and Properties | Cellulose Materials | | | | | | | |
|---|---|---|---|---|---|---|---|---|
| | $C_1$ | $C_2$ | $C_3$ | $C_4$ | $C_5$ | $C_6$ | $C_7$ | $C_8$ |
| Content of α-cellulose (%) | 50.97 | 83.61 | 90,19 | 92.94 | 91.23 | 93.08 | 80.89 | 92.92 |
| Content of hemicelluloses (%) | 45.91 | 9.09 | 7.95 | 2.26 | 2.25 | 2.77 | 10.99 | 1.03 |
| Content of resins (%) | 0.02 | 0.03 | 0.03 | 0.02 | 0.61 | 0.31 | 0.16 | 0.02 |
| Content of ash (%) | 0.00 | 0.09 | 0.10 | 0.10 | 0.06 | 0.20 | 0.09 | 0.02 |
| Content of water (%) | 3.10 | 7.18 | 1.73 | 4.68 | 5.85 | 3.64 | 7.87 | 6.01 |
| Total of the constituents | 100.00 | 100.00 | 100.00 | 100.00 | 100.00 | 100.00 | 100.00 | 100.00 |
| Content of cellulose (holocellulose) (%) | 96.88 | 92.70 | 98.14 | 95.20 | 93.48 | 95.85 | 91.88 | 93.95 |
| DP (degree of polymerization) | 270.0 | 300.0 | 414.0 | 553.5 | 570.0 | 900.0 | 1383.0 | 1119.0 |
| pH of the pulp | 6.98 | 7.11 | 7.20 | 6.95 | 6.30 | 6.42 | 5.20 | 8.50 |

TABLE 2
(Summary of the Examples of Chapter I)

| Example No. | Material (I) | Material (II) | Material (III) | Detailed Table No. |
|---|---|---|---|---|
| I-1* | $C_1, C_2, C_3, C_4, C_5, C_8$ | formic acid | orthophosphoric acid | 4 |
| I-2* | $C_1, C_6, C_7, C_8$ | " | " | 5 |
| I-3 | $C_1, C_6$ | " | " | 6 |
| I-4 | $C_1, C_6, C_8$ | " | " | 7 |
| I-5* | $C_1, C_6$ | formic acid + acetic acid | " | 8 |
| I-6* | $C_1$ | formic acid + other compounds or mixed anhydride of formic acid | " | 9 |
| I-7 | $C_1, C_6$ | formic acid + acetic acid | " | 10 |
| I-8* | $C_1, C_2, C_8$ | formic acid alone or with acetic acid | various compounds of phorphorus | 11 |
| I-9 | $C_1, C_8$ | formic acid | various compounds of phorphorus | 12 |
| I-10 | $C_1$ | various compounds without formic acid or without mixed anhydride of formic acid | orthophosphoric acid | 13 |
| I-11 | $C_1$ | formic acid | various compounds not in accord with the invention | 14 |

*Examples in accord with the invention

TABLE 3
(Products used for Base Materials (II) and (III))

| Reference number of the product | Nature of the product | Water content (% by weight) |
|---|---|---|
| 1 | Formic acid | 0.1 |
| 2 | Orthophosphoric acid | 0.6 |
| 3 | Acetic acid | 0.2 |
| 4 | Acetic anhydride | 0 |
| 5 | Mixed formic-acetic anhydride* | 0 |
| 6 | Acetyl chloride | 1 |
| 7 | Propionic acid | 0.1 |
| 8 | Aqueous formic acid | 48.3 |
| 9 | Methyl-2-butyric acid | 0.1 |
| 10 | Pyrophosphoric acid | 3 |
| 11 | Phosphoric anhydride | 0 |
| 12 | Aqueous orthophosphoric acid | 16 |
| 13 | Phosphorous acid | 0.4 |
| 14 | Boric acid | 0.4 |
| 15 | Tetrafluoroboric acid | 50 |
| 16 | Sulfuric acid | 0.3 |
| 17 | Trifluoroacetic acid | 2 |
| 18 | Methanesulfonic acid | 1 |
| 19 | Dichloroacetic acid | 0.4 |
| 20 | Monochloroacetic acid | 1 |
| 21 | Trichloroacetic acid | 1 |
| 22 | Formic Acid | 0.7 |
| 23 | Orthophosphoric acid | 1.3 |
| 24 | Chloro-2-propionic acid | 0.4 |

*Composition by weight: mixed anhydride: 35%; acetic anhydride: 15%; acetic acid: 50%

TABLE 4
Example I-1 (Tests in accord with the invention)

| | | Test Numbers | | | | | | |
|---|---|---|---|---|---|---|---|---|
| | | 1 | 2 | 3 | 4 | 5 | 6 | 7 |
| Base Materials | | | | | | | | |
| Ratios (%) | $R_I$ | 29.8 | 12.7 | 17.4 | 12.4 | 15.95 | 15.0 | 15.9 |
| | $R_{II}$ | 9.9 | 18.4 | 7.5 | 12.4 | 18.85 | 2.5 | 18.85 |
| | $R_{III}$ | 59.7 | 68.3 | 64.7 | 64.7 | 64.75 | 80.0 | 64.75 |
| | $R_{wr} = R_w$ | 0.6 | 0.6 | 10.4 | 10.4 | 0.45 | 2.5 | 0.5 |
| | Total | 100.0 | 100.0 | 100.0 | 100.0 | 100.0 | 100.0 | 100.0 |
| Agitation time (hours) | | 2.75 | 0.75 | 1.0 | 0.58 | 1.0 | 6.5 | 2.5 |
| Composition Obtained | | | | | | | | |
| Constitution (% by wt) | Cellulose derivative | 33.65 | 15.7 | 18.4 | 13.6 | 19.45 | 16.05 | 19.2 |
| | Organic acid | 3.6 | 13.5 | 5.9 | 10.5 | 13.1 | 0.8 | 13.4 |
| | Inorganic acid | 59.7 | 68.3 | 64.7 | 64.7 | 64.75 | 80.0 | 64.75 |
| | Water | 3.05 | 2.5 | 11.0 | 11.2 | 2.7 | 3.15 | 2.65 |
| | Total | 100.0 | 100.0 | 100.0 | 100.0 | 100.0 | 100.0 | 100.0 |
| Characteristics | Solubility | SL | SL | SL | SL | SL | SL | SL |
| | Nature of solution | ANIS | ANIS | ANIS | ANIS | ANIS | ANIS | ANIS |
| | DS cellulose (%) | 24.9 | 45.4 | 10.8 | 18.0 | 42.6 | 13.5 | 40.1 |
| | DP cellulose | 252 | 230 | 250 | 252 | 249.5 | 239 | 289 |
| | ΔDP absolute value | 18 | 40 | 20 | 18 | 20.5 | 31 | 11 |
| | ΔDP (%) | 6.7 | 14.8 | 7.4 | 6.7 | 7.6 | 11.5 | 3.7 |

| | | Test Numbers | | | | | |
|---|---|---|---|---|---|---|---|
| | | 8 | 9 | 10 | 11 | 12 | 13 |
| Base Materials | | | | | | | |
| Ratios (%) | $R_I$ | 15.9 | 15.9 | 15.9 | 24.2 | 16.0 | 14.0 |

TABLE 4-continued

Example I-1 (Tests in accord with the invention)

| | | | | | | | |
|---|---|---|---|---|---|---|---|
| | $R_{II}$ | 18.85 | 18.85 | 18.85 | 9.9 | 12.0 | 13.2 |
| | $R_{III}$ | 64.7 | 64.7 | 64.7 | 64.4 | 64.5 | 70.3 |
| | $R_{wr} = R_w$ | 0.55 | 0.55 | 0.55 | 1.5 | 7.5 | 2.5 |
| | Total | 100.0 | 100.0 | 100.0 | 100.0 | 100.0 | 100.0 |
| Agitation time (hours) | | 5.0 | 4.0 | 6.5 | 1.5 | 1.3 | 6.8 |
| Composition Obtained | | | | | | | |
| Constitution (% by wt) | Cellulose derivative | 19.0 | 19.05 | 19.4 | 27.4 | 17.7 | 16.5 |
| | Organic acid | 13.75 | 13.7 | 13.1 | 4.7 | 9.1 | 9.1 |
| | Inorganic acid | 64.7 | 64.7 | 64.7 | 64.4 | 64.5 | 70.3 |
| | Water | 2.55 | 2.55 | 2.8 | 3.5 | 8.6 | 4.1 |
| | Total | 100.0 | 100.0 | 100.0 | 100.0 | 100.0 | 100.0 |
| Characteristics | Solubility | SL | SL | SL | SL | SL | SL |
| | Nature of solution | ANIS | ANIS | ANIS | ANIS | ANIS | ANIS |
| | DS cellulose (%) | 37.6 | 38.2 | 42.6 | 25.3 | 21.0 | 34.4 |
| | DP cellulose | 385 | 514.5 | 497.5 | 860 | 916 | 219 |
| | ΔDP absolute value | 29 | 39 | 72.5 | 259 | 203 | 81 |
| | ΔDP (%) | 7.0 | 7.0 | 12.7 | 23.1 | 18.1 | 37.0 |

Remarks on Table 4
1. Base Materials:
Material (I): $C_1$: tests 1 to 6; $C_2$: tests 7 and 13; $C_3$: test No. 8; $C_4$: test No. 9; $C_5$: test No. 10; $C_8$: tests 11 and 12.
Material (II): formic acid (Table 3, product No. 1)
Material (III): orthophosphoric acid (Table 3, product No. 2).
In all the tests, one has $R_{wr} = R_w$.
2. Compositions Obtained:
Derivative of cellulose: cellulose formate
Organic acid: formic acid
Inorganic acid: orthophosphoric acid.

TABLE 5

Example I-2 (Tests in accord with the invention)

| | | Test Numbers | | | | | | |
|---|---|---|---|---|---|---|---|---|
| | | 1 | 2 | 3 | 4 | 5 | 6 | 7 |
| Base Materials | | | | | | | | |
| Ratios (%) | $R_I$ | 29.8 | 17.5 | 17.4 | 29.0 | 25.0 | 15.9 | 15.9 |
| | $R_{II}$ | 19.9 | 12.5 | 7.5 | 5.0 | 5.0 | 18.85 | 18.85 |
| | $R_{III}$ | 49.7 | 65.0 | 64.6 | 64.4 | 65.0 | 64.75 | 64.75 |
| | $R_{wr} = R_w$ | 0.6 | 5.0 | 10.5 | 1.6 | 5.0 | 0.5 | 0.5 |
| | Total | 100.0 | 100.0 | 100.0 | 100.0 | 100.0 | 100.0 | 100.0 |
| Agitation time (hours) | | 7.25 | 8 | 4 | 2.5 | 4.8 | 1.5 | 3 |
| Composition Obtained | | | | | | | | |
| Constitution (% by wt) | Cellulose derivative | 34.8 | 19.7 | 18.9 | 31.2 | 27.5 | 19.2 | 19.2 |
| | Organic acid | 11.7 | 8.8 | 5.1 | 1.4 | 0.9 | 13.4 | 13.4 |
| | Inorganic acid | 49.7 | 65.0 | 64.6 | 64.4 | 65.0 | 64.75 | 64.75 |
| | Water | 3.8 | 6.4 | 11.4 | 3.0 | 6.6 | 2.65 | 2.65 |
| | Total | 100.0 | 100.0 | 100.0 | 100.0 | 100.0 | 100.0 | 100.0 |
| Characteristics | Solubility | SL | SL | SL | SL | SL | SL | SL |
| | Nature of solution | ANIS | ANIS | ANIS | ANIS | ANIS | ANIS | ANIS |
| | DS cellulose (%) | 32.2 | 24.5 | 16.3 | 14.4 | 19.2 | 40.0 | 40.4 |
| | DP cellulose | 760 | 228 | 722 | 836 | 801 | 756 | 1111 |
| | ΔDP absolute value | 140 | 42 | 178 | 282 | 99 | 144 | 272 |
| | ΔDP (%) | 15.6 | 15.6 | 19.8 | 25.2 | 11.0 | 16.0 | 19.7 |

Remarks on table 5:
Same remarks as for Table 4 with the following differences in connection with base material (I):
$C_1$: Test 2
$C_6$: Tests 1 and 3; 5 and 6
$C_7$: Test 7
$C_8$: Test 4

TABLE 6

Example I-3 (Tests not in accord with the invention)

| | | Test Numbers | | | | | | | | |
|---|---|---|---|---|---|---|---|---|---|---|
| | | 1 | 2 | 3 | 4 | 5 | 6 | 7 | 8 | 9 |
| Base Materials | | | | | | | | | | |
| Ratios (%) | $R_I$ | 2.5 | 2.5 | 19.9 | 4.5 | 2.5 | 2.5 | 5.0 | 17.5 | 5.0 |
| | $R_{II}$ | 77.3 | 62.4 | 10.0 | 7.5 | 15.0 | 2.5 | 5.0 | 25.5 | 7.5 |
| | $R_{III}$ | 19.9 | 34.8 | 49.8 | 68.0 | 80.0 | 80.0 | 65.0 | 50.0 | 80.0 |
| | $R_{wr} = R_w$ | 0.3 | 0.3 | 20.3 | 20.0 | 2.5 | 15.0 | 25.0 | 10.0 | 7.5 |
| | Total | 100.0 | 100.0 | 100.0 | 100.0 | 100.0 | 100.0 | 100.0 | 100.0 | 100.0 |
| Agitation time (hours) | | 8 | 8 | 8 | 8 | 2 | 1.75 | 0.5 | 8 | 1.5 |
| Composition Obtained | | | | | | | | | | |
| Constitution (% by wt) | Cellulose derivative | | 3.2 | | | 3.0 | 2.6 | 5.5 | | 5.7 |
| | Organic acid | | 61.2 | | | 14.2 | 2.3 | 4.1 | | 6.4 |
| | Inorganic acid | | 34.8 | | | 80.0 | 80.0 | 65.0 | | 80.0 |
| | Water | | 0.8 | | | 2.8 | 15.1 | 25.4 | | 7.9 |
| | Total | | 100.0 | | | 100.0 | 100.0 | 100.0 | | 100.0 |
| Characteristics | Solubility | INSL | SL | INSL | INSL | SL | SL | SL | INSL | SL |

TABLE 6-continued

| Example I-3 (Tests not in accord with the invention) | | | | | | | | | |
|---|---|---|---|---|---|---|---|---|---|
| | Test Numbers | | | | | | | | |
| | 1 | 2 | 3 | 4 | 5 | 6 | 7 | 8 | 9 |
| Nature of solution | | IS | | | IS | IS | IS | | IS |
| DS cellulose (%) | | 57.3 | | | 39.2 | 9.5 | 21.0 | | 25.5 |

Remarks on Table 6:
Same remarks as for Table 4 with the following remark for the base Material I:
$C_1$: Tests 1 to 7 and 9
$C_6$: Test 8

TABLE 7

| Example I-4 (Tests not in accord with the invention) | | | | | | | | | |
|---|---|---|---|---|---|---|---|---|---|
| | | Test Numbers | | | | | | | |
| | | 1 | 2 | 3 | 4 | 5 | 6 | 7 | 8 |
| Base Materials | | | | | | | | | |
| Ratios (%) | $R_I$ | 2.5 | 19.8 | 7.5 | 5.0 | 5.0 | 2.5 | 22.5 | 30.4 |
| | $R_{II}$ | 87.3 | 10.0 | 7.5 | 27.5 | 40.0 | 20.0 | 20.0 | 29.7 |
| | $R_{III}$ | 10.0 | 49.7 | 49.8 | 65.0 | 50.0 | 65.0 | 50.0 | 42.4 |
| | $R_{wr} = R_w$ | 0.2 | 20.5 | 35.2 | 2.5 | 5.0 | 12.5 | 7.5 | −2.5 |
| | Total | 100.0 | 100.0 | 100.0 | 100.0 | 100.0 | 100.0 | 100.0 | 100.0 |
| Agitation time (hours) | | 8 | 8 | 8 | 4 | 2.5 | 2.5 | 8 | 8 |
| Composition Obtained | | | | | | | | | |
| Constitution (% by wt) | Cellulose derivative | | | | 6.05 | 6.1 | 2.85 | | |
| | Organic acid | | | | 25.8 | 38.2 | 19.4 | | |
| | Inorganic acid | | | | 65.0 | 50.0 | 65.0 | | |
| | Water | | | | 3.15 | 5.7 | 12.75 | | |
| | Total | | | | 100.0 | 100.0 | 100.00 | | |
| Characteristics | Solubility | INSL | INSL | INSL | SL | SL | SL | INSL | INSL |
| | Nature of solution | | | | IS | IS | IS | | |
| | DS cellulose (%) | | | | 40.4 | 41.9 | 28.1 | | |

Remarks on Table 7:
Same remarks as for Table 4 with the following remark for the base material (I):
$C_1$: Test 7
$C_6$: Tests 1 to 6
$C_8$: Test 8

TABLE 8

| Example I-5 (Tests in accord with the invention) | | | | | | | | | | |
|---|---|---|---|---|---|---|---|---|---|---|
| | | Test Numbers | | | | | | | | |
| | | 1 | 2 | 3 | 4 | 5 | 6 | 7 | 8 | 9 |
| Base Materials | | | | | | | | | | |
| Ratios (%) | $R_I$ | 34.8 | 15.0 | 30.0 | 30.0 | 15.9 | 16.3 | 16.4 | 14.5 | 17.5 |
| | $R_{II}$ | 20.0 | 2.5 | 10.0 | 5.0 | 18.85 | 18.95 | 18.8 | 5.0 | 30.0 |
| | $R_{III}$ | 44.7 | 80.0 | 55.0 | 57.5 | 64.7 | 64.15 | 64.25 | 68.0 | 50.0 |
| | $R_{wr} = R_w$ | 0.5 | 2.5 | 5.0 | 7.5 | 0.55 | 0.6 | 0.55 | 12.5 | 2.5 |
| | Total | 100.0 | 100.0 | 100.0 | 100.0 | 100.0 | 100.0 | 100.0 | 100.0 | 100.0 |
| Agitation time (hours) | | 2.8 | 1.7 | 2.3 | 8 | 2 | 1.5 | 4.5 | 5.3 | 3 |
| Composition Obtained | | | | | | | | | | |
| Constitution (% by wt) | Cellulose derivative | 39.8 | 15.9 | 32.5 | 31.6 | 19.1 | 19.15 | 18.9 | 15.3 | 20.9 |
| | Organic acid | 11.9 | 1.05 | 5.6 | 2.4 | 13.6 | 14.4 | 14.85 | 3.6 | 24.5 |
| | Inorganic acid | 44.7 | 80.0 | 55.0 | 57.5 | 64.7 | 64.15 | 64.25 | 68.0 | 50.0 |
| | Water | 3.6 | 3.05 | 6.6 | 8.5 | 2.6 | 2.3 | 2.0 | 13.0 | 4.6 |
| | Total | 100.0 | 100.0 | 100.0 | 100.0 | 100.0 | 100.0 | 100.0 | 100.0 | 100.0 |
| Characteristics | Solubility | SL | SL | SL | SL | SL | SL | SL | SL | SL |
| | Nature of solution | ANIS | ANIS | ANIS | ANIS | ANIS | ANIS | ANIS | ANIS | ANIS |
| | DS cellulose (%) | | | | | | | | | |
| | Formate group | 25.9 | 11.2 | 15.6 | 9.4 | 38.2 | 28.2 | 20.7 | 11.1 | 35.2 |
| | Acetate group | 1.17 | 0.1 | 0.33 | 0.7 | 0.4 | 3.8 | 5.8 | 0.0 | 1.4 |
| | DP cellulose | 252 | 262 | 217 | 203 | 258 | 254 | 248.5 | 485 | 724 |
| | ΔDP absolute value | 18 | 8 | 53 | 67 | 12 | 16 | 21.5 | 415 | 176 |
| | ΔDP (%) | 6.7 | 2.96 | 9.6 | 24.8 | 4.4 | 5.9 | 8.0 | 46.1 | 19.6 |

Remarks on Table 8
1. Base Materials
Material (I): $C_1$: Tests 1 to 7; $C_6$: Tests 8 and 9
Material (II): Mixture of formic acid (Table 3, product 1) and acetic acid (Table 3, product 3). The ratio of weight of formic acid to weight of acetic acid is equal to 9 for Tests 1 to 4, 8 and 9; it is equal to 4 for Test 5, to 1 for Test 6 and to 0.33 for Test 7.
Material (III): Orthophosphoric acid (Table 3, product 2). For all these tests one has $R_{wr} = R_w$.
2. Compositions Obtained
Derivative of cellulose: This is a mixed ester of cellulose having formate groups and acetate groups in

TABLE 8-continued

| | Example I-5 (Tests in accord with the invention) | | | | | | | | |
|---|---|---|---|---|---|---|---|---|---|
| | Test Numbers | | | | | | | | |
| | 1 | 2 | 3 | 4 | 5 | 6 | 7 | 8 | 9 | variable proportions.
Organic acids: This is a mixture of formic acid and
acetic acid. The percentage indicated corresponds to the
percentage of this mixture in the composition.
Inorganic acid: This is orthophosphoric acid.

TABLE 9

| | | Example I-6 (Tests in accord with the invention) | | | | | | | |
|---|---|---|---|---|---|---|---|---|---|
| | | Test Numbers | | | | | | | |
| | | 1 | 2 | 3 | 4 | 5 | 6 | 7 | 8 |
| Base Materials | | | | | | | | | |
| Ratios (%) | $R_I$ | 16.0 | 16.1 | 15.9 | 15.95 | 16.25 | 15.9 | 15.9 | 16.25 |
| | $R_{II}$ | 18.9 | 19.05 | 18.95 | 18.95 | 19.2 | 18.9 | 18.9 | 19.25 |
| | $R_{III}$ | 64.95 | 65.15 | 64.55 | 65.05 | 65.9 | 64.65 | 64.65 | 65.85 |
| | $R_{wr}$ | 0.15 | −0.3 | 0.60 | 0.05 | −1.35 | 0.55 | 0.55 | −1.35 |
| | Total | 100.0 | 100.0 | 100.0 | 100.0 | 100.0 | 100.0 | 100.0 | 100.0 |
| Agitation time (hours) | | 1 | 3.5 | 0.7 | 2 | 8 | 1 | 1 | 1.5 |
| Composition Obtained | | | | | | | | | |
| Constitution (% by wt) | Cellulose derivative | 19.5 | 19.5 | 18.7 | 19.3 | 19.7 | 19.3 | 19.35 | 19.9 |
| | Organic acid | 13.3 | 14.8 | 14.5 | 12.85 | 15.0 | 13.4 | 13.25 | 10.3 |
| | Inorganic acid | 64.75 | 64.4 | 64.6 | 65.65 | 64.75 | 64.6 | 64.65 | 68.85 |
| | Water | 2.45 | 1.3 | 2.2 | 2.2 | 0.55 | 2.7 | 2.75 | 0.95 |
| | Total | 100.0 | 100.0 | 100.0 | 100.0 | 100.0 | 100.0 | 100.0 | 100.0 |
| Characteristics | Solubility | SL | SL | SL | SL | SL | SL | SL | SL |
| | Nature of solution | ANIS | ANIS | ANIS | ANIS | ANIS | ANIS | ANIS | ANIS |
| DS cellulose (%) | | | | | | | | | |
| | Formate group | 42.8 | 34.7 | 32.4 | 40.3 | 17.8 | 40.0 | 41.3 | 31.2 |
| | Other groups | 0.6 | 5.7 | 0.25 | 0.6 | 18.6 | 0.6 | 0.2 | 11.6 |
| | DP cellulose | 250.5 | 262.5 | 268 | 246.5 | 244.5 | 255 | 245 | 265 |
| | ΔDP absolute value | 19.5 | 7.5 | 2 | 23.5 | 25.5 | 15 | 25 | 5 |
| | ΔDP (%) | 7.2 | 2.8 | 0.7 | 8.7 | 9.4 | 5.6 | 9.3 | 1.9 |

Remarks on Table 9
1. Base Materials
Material (I): $C_1$
Material (II):
Tests 1 and 2: Mixture of formic acid (Table 3,
product 1) and acetic anhydride (Table 3, product 4). The
ratio of weight of formic acid to weight of acetic anhydride
is equal to 8.9 for Test 1 and to 1 for Test 2.
Test 3: Material of formic acid (Table 3, product 1),
and chloro-2-propionic acid (Table 3, product 24). The
ratio of weight of formic acid to weight of
chloro-2-propionic acid is equal to 1.
Tests 4 and 8: Mixtures of formic acid (Table 3,
product 1) and acetyl chloride (Table 3, product 6).
The ratio of weight of formic acid to weight of acetyl
chloride is equal to 8.9 for Test 4 and to 1 for Test 8.
Test 5: Mixed formic-acetic anhydride (Table 3,
product 5).
Test 6: Mixture of formic acid (Table 3, product 1)
and propionic acid (Table 3, product 7). The ratio of
weight of formic acid to weight of propionic acid is equal
to 9.
Test 7: Mixture of formic acid (Table 3, product 1)
and methyl-2-butyric acid (Table 3, product 9). The ratio
of weight of formic acid to weight of methyl-2-butyric acid
is equal to 9.
Material (III): Orthophosphoric acid (Table 3,
product 2). For Tests 3, 6 and 7, one has $R_{wr} = R_w$.
2. Compositions Obtained
Derivative of cellulose: As in Table 8, there is
concerned for each test a mixed ester of cellulose
containing formate groups and groups of other esters (for
example, acetate groups in the case of Test 1).
Organic acids: For each test there is concerned a
mixture of formic acid and another acid (for example, acetic
acid in the case of Test 1).
Inorganic Acid: There is concerned orthophosphoric
acid or in the case of Tests 4 and 8 a mixture of
orthophosphoric acid and hydrochloric acid.

TABLE 10

Example I-7 (Tests not in accord with the invention)

| | | Test Numbers | | | | | |
|---|---|---|---|---|---|---|---|
| | | 1 | 2 | 3 | 4 | 5 | 6 |
| Base Materials | | | | | | | |
| Ratios (%) | $R_I$ | 2.0 | 2.5 | 2.0 | 2.5 | 20.0 | 40.4 |
| | $R_{II}$ | 2.5 | 2.5 | 10.0 | 15.0 | 20.0 | 10.9 |
| | $R_{III}$ | 68.0 | 80.0 | 68.0 | 80.0 | 50.0 | 53.7 |
| | $R_{wr} = R_w$ | 27.5 | 15.0 | 20.0 | 2.5 | 10.0 | −5.0 |
| | Total | 100.0 | 100.0 | 100.0 | 100.0 | 100.0 | 100.0 |
| Agitation time (hours) | | 8 | 1.17 | 8 | 0.75 | 5.5 | 8 |
| Composition Obtained | | | | | | | |
| Constitution (% by weight) | Cellulose derivative | | 2.6 | | 3.0 | | |
| | Organic acid | | 2.3 | | 14.2 | | |
| | Inorganic acid | | 80.0 | | 80.0 | | |
| | Water | | 15.1 | | 2.8 | | |
| | Total | | 100.0 | | 100.0 | | |
| Characteristics | Solubility | INSL | SL | INSL | SL | INSL | INSL |
| | Nature of solution | | IS | | IS | | |
| | DS cellulose (%) | | | | | | |
| | Formate group | | 9.0 | | 36.7 | | |
| | Other groups | | 0.03 | | 1.1 | | |

Remarks on Table 10
1. Base Materials:
Material (I): $C_1$: Tests 1, 2, 5 and 6; $C_6$:
Tests 3, 4.
Material (II): Mixture of formic acid (Table 3,
product 1) and acetic acid (Table 3, product 3). The ratio
of weight of formic acid to weight of acetic acid is equal
to 9 for all the tests.
Material (III): Orthophosphoric acid (Table 3,
product 2).
For all the tests: $R_{wr} = R_w$.
2. Compositions Obtained:
Same remarks as for Table 8, taking into account the
fact that Tests 1, 3, 5 and 6 do not give a solution.

TABLE 11

Example I-8 (Tests in accord with the invention)

| | | Test Numbers | | | | | | | | | |
|---|---|---|---|---|---|---|---|---|---|---|---|
| | | 1 | 2 | 3 | 4 | 5 | 6 | 7 | 8 | 9 | 10 |
| Base Materials | | | | | | | | | | | |
| Ratios (%) | $R_I$ | 17.0 | 15.3 | 17.15 | 17.55 | 17.95 | 17.95 | 17.65 | 19.4 | 16.45 | 25.6 |
| | $R_{II}$ | 20.15 | 42.2 | 20.35 | 20.85 | 15.8 | 21.45 | 20.95 | 23.0 | 19.65 | 19.7 |
| | $R_{III}$ | 69.3 | 45.0 | 62.2 | 64.7 | 71.65 | 66.9 | 60.9 | 57.3 | 66.7 | 57.1 |
| | $R_{wr}$ | −6.45 | −2.5 | 0.3 | −3.1 | −5.4 | −6.3 | 0.5 | 0.3 | −2.8 | −2.5 |
| | Total | 100.0 | 100.0 | 100.0 | 100.0 | 100.0 | 100.0 | 100.0 | 100.0 | 100.0 | 100.0 |
| Agitation time (hours) | | 1.5 | 4.5 | 1.25 | 1 | 2 | 2 | 0.5 | 0.5 | 1.5 | 1.5 |
| Composition Obtained | | | | | | | | | | | |
| Constitution (% by wt) | Cellulose derivative | 20.0 | 19.4 | 19.1 | 19.6 | 19.85 | 20.4 | 18.2 | 18.4 | 18.9 | 30.0 |
| | Organic acid | 12.2 | 35.4 | 13.6 | 12.8 | 7.5 | 11.65 | 15.1 | 14.8 | 14.1 | 12.5 |
| | Inorganic acid | 67.9 | 45.0 | 64.9 | 67.6 | 72.65 | 67.95 | 64.8 | 64.9 | 67.0 | 57.1 |
| | Water | 0 | 0.2 | 2.4 | 0 | 0 | 0 | 1.9 | 1.9 | 0 | 0.4 |
| | Total | 100.0 | 100.0 | 100.0 | 100.0 | 100.0 | 100.0 | 100.0 | 100.0 | 100.0 | 100.0 |
| Characteristics | Solubility | SL | SL | SL | SL | SL | SL | SL | SL | SL | SL |
| | Nature of solution | ANIS | ANIS | ANIS | ANIS | ANIS | ANIS | ANIS | ANIS | ANIS | ANIS |
| | DS cellulose (%) | | | | | | | | | | |
| | Formate groups | | | | | | 54.3 | 27.5 | 30.4 | 34.4 | 33.2 |
| | Other groups | 49.3 | 51.6 | 39.1 | 44.6 | 48.2 | | | | 1.3 | |
| | DP cellulose | 242.5 | 668 | 242.5 | 251.0 | 260.5 | 257.5 | 270 | 260.5 | 259 | 817 |
| | ΔDP absolute value | 27.5 | 451 | 27.5 | 19.0 | 9.5 | 12.5 | 0.0 | 9.5 | 11.0 | 302 |
| | ΔDP (%) | 10.2 | 40.3 | 10.2 | 7.0 | 3.5 | 4.6 | 0.0 | 3.5 | 4.1 | 26.9 |

Remarks on Table 11
1. Base Materials:
Material (I): $C_1$: Tests 1 and 3 to 9
$C_2$: Test 10
$C_8$: Test 2
Material (II):
Tests 1 to 7 and 10: Formic acid (Table 3, product 1).
Test 9: Mixture of formic acid (Table 3, product 1) and acetic acid (Table 3, product 3), the ratio of weight of formic acid to weight of acetic acid being equal to 1.
Test 8: Aqueous formic acid (Table 3, product 8).
Material (III):
Test 1: Pyrophosphoric acid (Table 3, product 10).
Tests 2, 9 and 10: Mixture of orthophosphoric acid (Table 3, product 2) and pyrophosphoric acid (Table 3, product 10). The ratio of weight of orthophosphoric acid to weight of pyrophosphoric acid being equal to 0.74 for Test 2, to 1 for Test 9, and to 1.24 for Test 10.
Tests 3 to 7: Mixture of aqueous orthophosphoric acid (Table 3, product 12) and phosphoric anhydride (Table 3, product 11). The ratio

TABLE 11-continued

Example I-8 (Tests in accord with the invention)

Test Numbers: 1 2 3 4 5 6 7 8 9 10 of weight of orthophosphoric acid to weight of phosphoric anhydride is equal to 2 for Test 3, to 1.35 for Test 4, to 1.12 for Test No. 5, to 0.98 for Test 6 and to 1.08 for Test 7.
Test 8: Phosphoric anhydride alone (Table 3, product 11).

2. Compositions Obtained:
The organic acids are formic acid (Tests 1 to 8 and 10) or a mixture of formic acid and acetic acid (Test 9).
The inorganic acids consist of a mixture of orthophosphoric acid and other acids of phosphorus.
The derivatives of cellulose are either cellulose formate (Tests 1 to 8 and 10) or a mixed ester of cellulose containing formate groups and acetate groups (Test 9).

TABLE 12

Example I-9 (Tests not in accord with the invention)

| Base Materials | | Test 1 | Test 2 | Test 3 |
|---|---|---|---|---|
| Ratios (%) | $R_I$ | 2.6 | 35.0 | 45.0 |
| | $R_{II}$ | 24.15 | 30.0 | 10.0 |
| | $R_{III}$ | 73.25 | 37.5 | 50.0 |
| | $R_{wr}$ | 0.0 | −2.5 | −5.0 |
| | Total | 100.0 | 100.0 | 100.0 |
| Agitation time (hours) | | 0.5 | 8 | 8 |
| Composition Obtained | | | | |
| Constitution (% by wt) | Cellulose derivative | 3.0 | | |
| | Organic acid | 21.1 | | |
| | Inorganic acid | 75.5 | | |
| | Water | 0.4 | | |
| | Total | 100.0 | | |
| Characteristics | Solubility | SL | INSL | INSL |
| | Nature of solution | IS | | |
| | DS cellulose (%) | 49.3 | | |

Remarks on Table 12
1. Base Materials:
Material (I): $C_1$: Test 1
$C_8$: Tests 2 and 3
Material (II): Formic acid (Table 3, product 1).
Material (III): Tests 1 and 3: Mixture of orthophosphoric acid (Table 3, product 2) and phosphoric anhydride (Table 3, product 11). The ratio of weight of orthophosphoric acid to weight of phosphoric anhydride is equal to 2.0 for Test 1 and to 2.44 for Test 3.
Test 2: Mixture of orthophosphoric acid (Table 3, product 2) and pyrophosphoric acid (Table 3, product 10). The ratio of weight of orthophosphoric acid to weight of pyrophosphoric acid is equal to 0.42.

2. Composition Obtained:
Derivative of cellulose: Cellulose formate.
Organic acid: Formic acid.
Inorganic acids: Mixtures of phosphoric acids.

TABLE 13

Example I-10 (Tests not in accord with the invention)

| Base Materials | | 1 | 2 | 3 | 4 | 5 | 6 |
|---|---|---|---|---|---|---|---|
| Ratios (%) | $R_I$ | 16.85 | 16.45 | 6.6 | 15.9 | 16.6 | 6.5 |
| | $R_{II}$ | 19.55 | 19.45 | 19.45 | 18.9 | 19.7 | 22.05 |
| | $R_{III}$ | 66.45 | 66.95 | 76.85 | 64.8 | 67.8 | 75.75 |
| | $R_{wr}$ | −2.85 | −2.85 | −2.9 | 0.4 | −4.1 | −4.3 |
| | Total | 100.0 | 100.0 | 100.0 | 100.0 | 100.0 | 100.0 |
| Agitation time (hours) | | 8 | 8 | 4.25 | 8 | 8 | 2 |
| Composition Obtained | | | | | | | |
| Constitution (% by wt) | Cellulose derivative | | | 9.5 | | | |
| | Organic acid | | | 16.2 | | | |
| | Inorganic acid | | | 74.3 | | | |
| | Water | | | 0 | | | |
| | Total | | | 100.00 | | | |
| Characteristics | Solubility | INSL | INSL | SL | INSL | INSL | SL |
| | Nature of solution | | | IS | | | IS |
| | DS cellulose (%) | | | 62.3 | | | |

Remarks on Table 13
1. Base Materials:
Material (I): $C_1$
Material (II): No formic acid or mixed anhydride of formic acid.
Tests 1, 2, 3: Acetic anhydride (Table 3, product 4).
Test 4: Acetic acid (Table 3, product 3).
Tests 5 and 6: Acetyl chloride (Table 3, product 6).
Material (III): Orthophosphoric acid (Table 3, product 2).
For test 4, $R_{wr} = R_w$.

2. Compositions Obtained: The derivative of cellulose is cellulose acetate, the organic acid is acetic acid, the inorganic acid is orthophosphoric acid together possibly with hydrochloride acid.

TABLE 14

Example I-11 (Tests not in accord with the invention)

| Base Materials | | 1 | 2 | 3 | 4 | 5 | 6 | 7 | 8 | 9 | 10 |
|---|---|---|---|---|---|---|---|---|---|---|---|
| Ratios (%) | $R_I$ | 15.9 | 15.9 | 15.9 | 15.9 | 15.9 | 15.9 | 15.9 | 15.95 | 15.95 | 19.7 |
| | $R_{II}$ | 18.85 | 18.85 | 18.85 | 18.85 | 18.85 | 18.85 | 18.85 | 18.85 | 18.85 | 75.9 |
| | $R_{III}$ | 64.75 | 64.75 | 32.5 | 64.8 | 64.75 | 64.75 | 64.75 | 64.35 | 64.35 | 3.4 |
| | $R_{wr} = R_w$ | 0.5 | 0.5 | 32.75 | 0.45 | 0.5 | 0.5 | 0.5 | 0.85 | 0.85 | 1.0 |

TABLE 14-continued

Example I-11 (Tests not in accord with the invention)

|  |  | Test Numbers | | | | | | | | | |
|---|---|---|---|---|---|---|---|---|---|---|---|
|  |  | 1 | 2 | 3 | 4 | 5 | 6 | 7 | 8 | 9 | 10 |
|  | Total | 100.0 | 100.0 | 100.0 | 100.0 | 100.0 | 100.0 | 100.0 | 100.0 | 100.0 | 100.0 |
| Agitation time (hours) |  | 8 | 8 | 8 | 0.25 | 8 | 1 | 8 | 8 | 8 | 8 |
| Composition Obtained |  |  |  |  |  |  |  |  |  |  |  |
| Constitution (% by wt) | Cellulose derivative |  |  |  | 18.35 |  | 20.3 |  |  |  |  |
|  | Organic acid |  |  |  | 14.85 |  | 11.65 |  |  |  |  |
|  | Inorganic acid |  |  |  | 64.8 |  | 64.75 |  |  |  |  |
|  | Water |  |  |  | 2.0 |  | 3.3 |  |  |  |  |
|  | Total |  |  |  | 100.00 |  | 100.00 |  |  |  |  |
| Characteristics | Solubility | INSL | INSL | INSL | SL | INSL | SL | INSL | INSL | INSL | INSL |
|  | Nature of solution |  |  |  | IS |  | IS |  |  |  |  |
|  | DS cellulose (%) |  |  |  | 29.6 |  | 53.2 |  |  |  |  |

Remarks on Table 14
1. Base Materials:
Material (I): $C_1$.
Material (II): Formic acid (Table 3, product 1).
Material (III): Test 1: phosphorous acid; Test 2: boric acid; Test 3: tetrafluoroboric acid; Test 4: sulfuric acid; Test 5: trifluoroacetic acid; Test 6: methanesulfonic acid; Test 7: dichloroacetic acid; Test 8: monochloroacetic acid; Test 9: trichloroacetic acid.
All these products are referenced under Nos. 13, 14, 15, 16, 17, 18, 19, 20 and 21 respectively in Table 3. Test 10: hydrochloric acid coming from material (II) which has been saturated with gaseous HCl.
2. Compositions Obtained: The cellulose derivative is essentially cellulose formate. The organic acid is formic acid. The miscellaneous acids are the same as those of material (III).

D. Conclusions Concerning the Examples

The conclusions which can be derived from Examples I-1 to I-11 are as follow:

(1) Examples not in accord with the invention: Examples I-3, I-4, I-7, I-9, I-10 and I-11 are not in accord with the invention for the following reasons:

Either at least one of the ratios $R_I$, $R_{II}$, $R_{III}$, $R_{wr}$ does not verify the relationships given previously in the definition of the dissolution process according to the invention. This is true of Examples I-3, I-4, I-7, I-9, or materials (II) or (III) are not in accord with those indicated in said definition of the dissolution process (Examples I-10, I-11).

In all cases, these examples which are not in accord with the invention lead to the following results:

Either no solution of the cellulose in the form of cellulose derivative is obtained, or a solution is formed but this solution is isotropic.

These two types of compositions do not correspond to the previously indicated definition of the composition according to the invention. The compositions of these examples not in accord with the invention are not suitable for the production of fibers or films having high mechanical properties.

(2) Examples in accord with the invention: Examples I-1, I-2, I-5, I-6, I-8 are in accord with the process of dissolution of the invention. These examples lead in all cases to compositions in accord with the invention, each formed of an anisotropic solution of cellulose in the form of cellulose derivative, that is to say to compositions capable of giving fibers or films having high mechanical properties, as shown in further detail in the Examples of Chapters II and III which follow.

Figure 2:
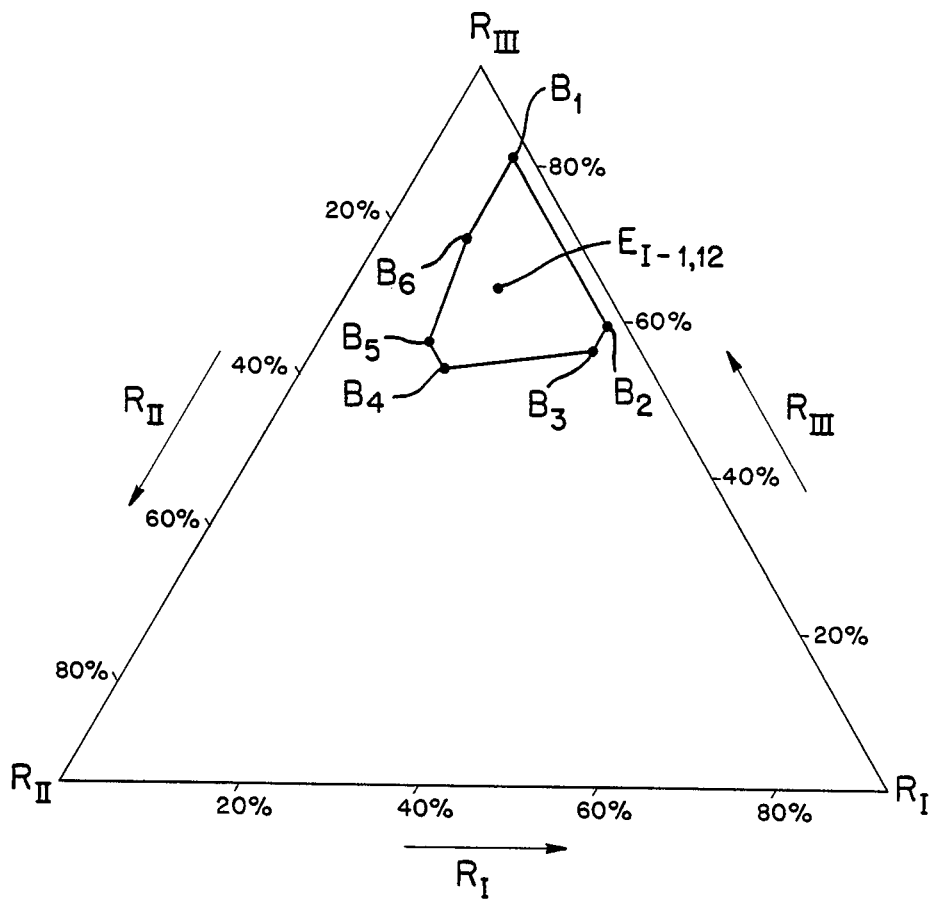

In the process of dissolution according to the invention, the relationships between the ratios $R_I$, $R_{II}$, $R_{III}$, $R_{wr}$ correspond unexpectedly to a very limited range. By way of example, FIGS. 1 and 2 show ternary diagrams which makes it possible to illustrate this fact. The materials (I), (II), (III) used to produce these diagrams are the following:

Material (I): Cellulose materials the cellulose of which has a degree of polymerization DP greater than 150 and less than 1500, these materials being selected for instance from materials $C_1$ to $C_8$ of Table 1.

Material (II): Mixture of formic acid (product 1, Table 3) and acetic acid (product 3, Table 3), the ratio of the anhydrous weights, namely weight of formic acid to weight of acetic acid, being equal to 9.

Material (III): Orthophosphoric acid (product 2, Table 3).

The diagram of FIG. 1 corresponds to $R_{wr}=R_w=0.0\%$ and the diagram of FIG. 2 corresponds to $R_{wr}=R_w=7.5\%$. The coordinates of each of these diagrams correspond to the ratios $R_I$, $R_{II}$, $R_{III}$ with the relationship $$R_I+R_{II}+R_{III}+R_w=1.$$

In FIG. 1, the region located within the polygon $A_1$, $A_2$, $A_3$, $A_4$, $A_5$, $A_6$ or on the sides of this polygon corresponds to the relationships between the ratios $R_I$, $R_{II}$, $R_{III}$ given previously under characteristic (c) of the process of dissolution according to the invention for the value $R_{wr}=R_w=0.0\%$, these relationships remaining valid for the interval of $R_{wr}$ given by the relationship $-2.5\% < R_{wr} < 2.5\%$. In FIG. 1, the coordinates of the points $A_1$, $A_2$, $A_3$, $A_4$, $A_5$ and $A_6$ are as follows:

$A_1$: $R_I=10.0\%$, $R_{II}=2.0\%$, $R_{III}=88.0\%$;
$A_2$: $R_I=38.0\%$, $R_{II}=2.0\%$, $R_{III}=60.0\%$;
$A_3$: $R_I=38.0\%$, $R_{II}=19.0\%$, $R_{III}=43.0\%$;
$A_4$: $R_I=19.5\%$, $R_{II}=40.0\%$, $R_{III}=40.5\%$;
$A_5$: $R_I=12.5\%$, $R_{II}=40.0\%$, $R_{III}=47.5\%$;
$A_6$: $R_I=10.0\%$, $R_{II}=33.0\%$, $R_{III}=57.0\%$.

In FIG. 2, the region located within the polygon $B_1$, $B_2$, $B_3$, $B_4$, $B_5$, $B_6$ or on the sides of this polygon corresponds to the relationships between the ratios $R_I$, $R_{II}$, $R_{III}$ given previously under characteristic (c) of the process of dissolution according to the invention for the value of $R_{wr}=R_w=7.5\%$, these relationships remaining valid for the interval of $R_{wr}$ given by the relationship $$7.5\% \leq R_{wr} < 10.0\%.$$

In FIG. 2, the coordinates of the points $B_1$, $B_2$, $B_3$, $B_4$, $B_5$, and $B_6$ are as follows:

$B_1$: $R_I=10.0\%$, $R_{II}=2.0\%$, $R_{III}=80.5\%$;
$B_2$: $R_I=31.0\%$, $R_{II}=2.0\%$, $R_{III}=59.5\%$;
$B_3$: $R_I=31.0\%$, $R_{II}=4.5\%$, $R_{III}=57.0\%$;
$B_4$: $R_I=15.5\%$, $R_{II}=23.0\%$, $R_{III}=54.0\%$;
$B_5$: $R_I=12.5\%$, $R_{II}=23.0\%$, $R_{III}=57.0\%$;

$B_6$: $R_I = 10.0\%$, $R_{II} = 12.0\%$, $R_{III} = 70.5\%$.

Each of these regions corresponds to a small area as compared with that of the corresponding ternary diagram, represented by the triangle of the Figure in question. This area is smaller the higher $R_{wr}$ is when $R_{wr}$ is positive.

In FIG. 1, the point $E_{I-1, 1}$ corresponds to Test 1 of Example I-1 and in FIG. 2 the point $E_{I-1, 12}$ corresponds to Test 12 of Example I-1.

It is possible to find at least one material (I) the cellulose of which has a degree of polymerization DP greater than 150 and less than 1500, such that the relationships given under characteristic (c) of the process of dissolution according to the invention lead to a composition in accord with the invention.

Preferably the cellulose of cellulose material (I) has a degree of polymerization DP at least equal to 200 and at most equal to 1200 and one has the following relationships between $R_I$, $R_{II}$, $R_{III}$, $R_{wr}$ the values of which are expressed in %:

If $R_{wr}$ verifies the relationship: $10.0 \leq R_{wr} < 12.5$
one has the relationships: $13.0 \leq R_I \leq 19.0$; $4.0 \leq R_{II} \leq 11.0$
with the relationship: $R_{II} - 0.73 R_I - 2.45$ if $R_I$ verifies the relationship: $R_I < 18.5$,
or with the relationship: $R_{II} \leq -2.00 R_I + 48.00$ if $R_I$ verifies the relationship: $R_I \geq 18.5$;

If $R_{wr}$ verifies the relationship: $7.5 \leq R_{wr} < 10.0$
one has the relationships: $12.25 \leq R_I \leq 23.0$; $4.0 \leq R_{II} \leq 19.5$
with the relationship: $R_{II} \leq 1.65 R_I - 10.24$ if $R_I$ verifies the relationship: $R_I < 18.0$,
or with the relationship: $R_{II} \leq -1.40 R_I + 44.70$ if $R_I$ verifies the relationship: $R_I$-18.0;

If $R_{wr}$ verifies the relationship: $5.0 \leq R_{wr} < 7.5$
one has the relationships: $11.5 \leq R_I \leq 27.5$; $4.0 \leq R_{II} \leq 24.0$
with the relationship: $R_{II} \leq 1.38 R_I - 2.81$ if $R_I$ verifies the relationship: $R_I < 19.5$,
or with the relationship: $R_{II} \leq -1.56 R_I + 54.47$ if $R_I$ verifies the relationship: $R_I \geq 19.5$;

If $R_{wr}$ verifies the relationship: $2.5 \leq R_{wr} < 5.0$
one has the relationships: $10.75 \leq R_I \leq 32.0$; $4.0 \leq R_{II} \leq 30.0$
with the relationship: $R_{II} \leq 2.07 R_I - 5.80$ if $R_I$ verifies the relationship: $R_I \leq 17.5$,
or with the relationship: $R_{II} \leq -1.30 R_I + 56.74$ if $R_I$ verifies the relationship: $R_I \geq 20.5$;

If $R_{wr}$ verifies the relationship: $-2.5 < R_{wr} < 2.5$
one has the relationships: $10.0 \leq R_I \leq 33.5$; $4.0 \leq R_{II} \leq 35.0$
with the relationship: $R_{II} \leq 3.20 R_I - 13.00$ if $R_I$ verifies the relationship: $R_I \leq 15.0$,
or with the relationship: $R_{II} \leq -1.76 R_I + 75.52$ if $R_I$ verifies the relationship: $R_I \geq 23.0$;

If $R_{wr}$ verifies the relationship: $-5.0 < R_{wr} \leq -2.5$
one has the relationships: $10.0 \leq R_I \leq 33.5$; $4.0 \leq R_{II} \leq 35.0$
with the relationship: $R_{II} \leq 3.20 R_I - 13.00$ if $R_I$ verifies the relationship: $R_I \leq 15.0$,
or with the relationship: $R_{II} \leq -1.85 R_I + 72.85$ if $R_I$ verifies the relationship: $R_I \geq 20.5$.

In this case one obtains an anisotropic solution whatever the degree of polymerization DP of the cellulose of material (I) with the previously cited DP range $200 \leq DP \leq 1200$. The cellulose of cellulose material (I) preferably has a degree of polymerization DP at least equal to 200 and at most equal to 1200 and one has the following relationships between $R_I$, $R_{II}$, $R_{III}$, $R_{wr}$, the values of which are expressed in %:

If $R_{wr}$ verifies the relationship: $7.5 < R_{wr} \leq 10.0$
one has the relationships: $13.0 \leq R_I \leq 19.0$; $4.0 \leq R_{II} \leq 11.0$
with the relationship: $R_{II} \leq 0.73 R_I - 2.45$ if $R_I$ verifies the relationship: $R_I < 18.5$,
or with the relationship: $R_{II} \leq -2.00 R_I + 48.00$ if $R_I$ verifies the relationship: $R_I \geq 18.5$;

If $R_{wr}$ verifies the relationship: $5.0 < R_{wr} \leq 7.5$
one has the relationships: $12.25 \leq R_I \leq 23.0$; $4.0 \leq R_{II} \leq 19.5$
with the relationship: $R_{II} \leq 1.65 R_I - 10.24$ if $R_I$ verifies the relationship: $R_I < 18.0$,
or with the relationship: $R_{II} \leq -1.40 R_I + 44.70$ if $R_I$ verifies the relationship: $R_I \geq 18.0$;

If $R_{wr}$ verifies the relationship: $2.5 < R_{wr} \leq 5.0$
one has the relationships: $11.5 \leq R_I \leq 27.5$; $4.0 \leq R_{II} \leq 24.0$
with the relationship: $R_{II} \leq 1.38 R_I - 2.81$ if $R_I$ verifies the relationship: $R_I < 19.5$,
or with the relationship: $R_{II} \leq -1.56 R_I + 54.47$ if $R_I$ verifies the relationship: $R_I \geq 19.5$;

If $R_{wr}$ verifies the relationship: $0.0 < R_{wr} \leq 2.5$
one has the relationships: $10.75 \leq R_I \leq 32.0$; $4.0 \leq R_{II} \leq 30.0$
with the relationship: $R_{II} \leq 2.07 R_I - 5.80$ if $R_I$ verifies the relationship: $R_I \leq 17.5$,
or with the relationship: $R_{II} \leq -1.30 R_I + 56.74$ if $R_I$ verifies the relationship: $R_I \geq 20.5$;

If $R_{wr}$ verifies the relationship: $-2.5 \leq R_{wr} \leq 0.0$
one has the relationships: $10.0 \leq R_I \leq 33.5$; $4.0 \leq R_{II} \leq 35.0$
with the relationship: $R_{II} \leq 3.20 R_I - 13.00$ if $R_I$ verifies the relationship: $R_I \leq 15.0$,
or with the relationship: $R_{II} \leq -1.85 R_I + 72.85$ if $R_I$ verifies the relationship: $R_I \geq 20.5$.

The composition according to the invention which is obtained by the process of dissolution according to the invention has the property of being both a solution of at least one cellulose derivative with cellulose formate groups and an anisotropic solution. These two conditions unexpectedly correspond to a very limited range as shown by the following remarks.

In the composition according to the invention, the percentages by weight $r_I$, $r_{II}$, $r_{III}$, $r_w$ are defined by the following relationships:

$r_I$: percentage of the cellulose derivative or derivatives;

$r_{II}$: percentage of the so-called "organic acid" phase, this phase comprising all the organic acids, organic acid anhydrides, and organic acid halides possibly present in the composition;

$r_{III}$: percentage of the so-called "phosphoric acid" phase, this phase comprising the phosphoric acids and phosphoric anhydride which are possibly present in the composition;

$r_w$: percentage of water possibly present in the composition.

These percentages $r_I$, $r_{II}$, $r_{III}$, $r_w$ are calculated on the following total weight: weight of the cellulose derivative or derivatives + weight of the "organic acid" phase + weight of the "phosphoric acid" phase + weight of any water present.

These percentages $r_I$, $r_{II}$, $r_{III}$, $r_w$ are the percentages indicated in the tables of the tests according to the invention, with the following correspondence:

| $r_I$: | percentage indicated on the cellulose derivative line |
|---|---|
| $r_{II}$: | percentage indicated on the organic acid line |
| $r_{III}$: | percentage indicated on the inorganic acid line |
| $r_w$: | percentage indicated on the water line. |

The percentages $r_I$, $r_{II}$, $r_{III}$, $r_w$ always verify the following relationship $r_I+r_{II}+r_{III}+r_w=1$. When the composition does not contain water one, of course, has $r_w=0$. In the compositions according to the invention, $r_I$ is at least equal to 10.2%.

The percentages $r_I$, $r_{II}$, $r_{III}$, $r_w$ make it possible to define a quaternary diagram.

The values of $r_w$ are distributed into intervals. In each interval one has $r_{wi} \leq r_w < r_{wj}$, $r_{wi}$ and $r_{wj}$ being fixed values. For each $r_{wi}$ value, that is to say when one has the relationship $r_I+r_{II}+r_{III}=1-r_{wi}$, one defines a polygon comprising a number of vertices which may vary from one interval to the other, each of these vertices being marked generally as $C_k$ (k being a variable) and being defined by its coordinates $r_{Ik}$, $r_{IIk}$, $r_{IIIk}$ in the ternary diagram corresponding to the value $r_{wi}$, that is to say in the ternary diagram of the $r_{wi}$ plane. In each interval $r_{wi} \leq r_w < r_{wj}$, every point of the quaternary diagram of coordinates $r_I$, $r_{II}$, $r_{III}$, $r_w$ corresponding to a composition according to the invention is projected onto the plane $r_{wi}$ and perpendicular to this plane, within the polygon of vertices $C_k$ or on the sides of this polygon.

Figure 3:
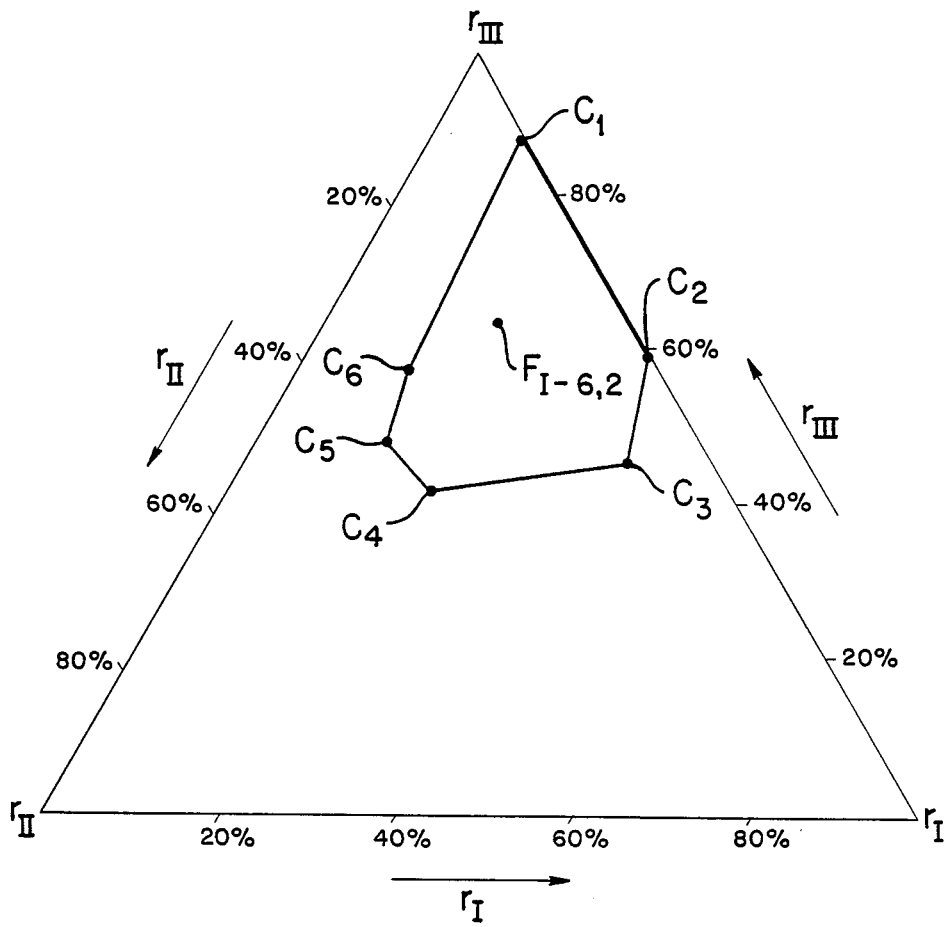
FIG. 3 is a ternary diagram illustrating a number of compositions in accordance with the invention.

By way of example, FIG. 3 shows a ternary diagram which makes it possible to illustrate this fact. For this diagram, the materials are as follows:

Cellulose derivative: Mixed ester of cellulose containing formate groups and acetate groups, the degree of polymerization DP of the cellulose in this derivative being greater than 150 and less than 1500.

"Organic acid" phase: Formic acid together possibly with acetic acid.

"Phosphoric acid" phase: Orthophosphoric acid.

FIG. 3 corresponds to a value $r_{wi}=1.4\%$. The polygon corresponding to this value $r_{wi}$ is a hexagon whose vertices $C_1$, $C_2$, $C_3$, $C_4$, $C_5$ and $C_6$ are in accord with the preceding definition for the value $r_{wi}=1.4\%$, that is to say the coordinates of these vertices are as follows:

$C_1$ ($r_I=10.8\%$, $r_{II}=0.5\%$, $r_{III}=87.3\%$)
$C_2$ ($r_I=38.9\%$, $r_{II}=0.1\%$, $r_{III}=59.6\%$)
$C_3$ ($r_I=43.6\%$, $r_{II}=9.8\%$, $r_{III}=45.2\%$)
$C_4$ ($r_I=23.6\%$, $r_{II}=33.3\%$, $r_{III}=41.7\%$)
$C_5$ ($r_I=15.2\%$, $r_{II}=35.5\%$, $r_{III}=47.9\%$)
$C_6$ ($r_I=12.7\%$, $r_{II}=28.6\%$, $r_{III}=57.3\%$)

The area defined by this polygon is small as compared with the ternary diagram represented by the triangle of FIG. 3. In the interval $1.4\% \leq r_w < 3.8\%$, every point of the quaternary diagram of coordinates $r_I$, $r_{II}$, $r_{III}$, $r_w$ capable of giving a composition according to the invention is projected onto the plane of FIG. 3 and perpendicular to said plane, within the polygon or on the sides of this polygon $C_1$, $C_2$, $C_3$, $C_4$, $C_5$ and $C_6$.

By way of example, point $F_{I-6, 2}$ corresponds to the composition of Test 2 of Example I-6.

Preferably the degree of polymerization DP of the cellulose in the cellulose derivative or derivatives is at least equal to 200 and at most equal to 1200 and the intervals $r_{wi} \leq r_w < r_{wj}$ and the polygons of vertices $C_k$ corresponding to these intervals and located in the ternary diagrams of the planes $r_{wi}$ are given by the following relationships, the values of $r_{wi}$, $r_w$, $r_{wj}$ and the values of the coordinates of the vertices $C_k$ being expressed in %:

for $0.0 \leq r_w < 1.4$, this polygon is a hexagon of vertices:

$C_1$ ($r_{I1}=11.5$, $r_{II1}=1.9$, $r_{III1}=86.6$)
$C_2$ ($r_{I2}=35.5$, $r_{II2}=0.4$, $r_{III2}=64.1$)
$C_3$ ($r_{I3}=37.3$, $r_{II3}=4.7$, $r_{III3}=58.0$)
$C_4$ ($r_{I4}=24.9$, $r_{II4}=27.8$, $r_{III4}=47.3$)
$C_5$ ($r_{I5}=18.7$, $r_{II5}=28.9$, $r_{III5}=52.4$)
$C_6$ ($r_{I6}=12.5$, $r_{II6}=14.9$, $r_{III6}=72.6$)

for $1.4 \leq r_w < 3.8$, this polygon is a hexagon of vertices:

$C_1$ ($r_{I1}=11.0$, $r_{II1}=2.4$, $r_{III1}=85.2$)
$C_2$ ($r_{I2}=35.8$, $r_{II2}=0.3$, $r_{III2}=62.5$)
$C_3$ ($r_{I3}=37.8$, $r_{II3}=9.4$, $r_{III3}=51.4$)
$C_4$ ($r_{I4}=27.5$, $r_{II4}=27.6$, $r_{III4}=43.5$)
$C_5$ ($r_{I5}=18.3$, $r_{II5}=29.6$, $r_{III5}=50.7$)
$C_6$ ($r_{I6}=12.5$, $r_{II6}=14.8$, $r_{III6}=71.3$)

for $3.8 \leq r_w < 6.2$, this polygon is a hexagon of vertices:

$C_1$ ($r_{I1}=11.8$, $r_{II1}=2.4$, $r_{III1}=82.0$)
$C_2$ ($r_{I2}=34.0$, $r_{II2}=0.7$, $r_{III2}=61.5$)
$C_3$ ($r_{I3}=36.6$, $r_{II3}=7.4$, $r_{III3}=52.2$)
$C_4$ ($r_{I4}=23.9$, $r_{II4}=24.4$, $r_{III4}=47.9$)
$C_5$ ($r_{I5}=20.7$, $r_{II5}=24.8$, $r_{III5}=50.7$)
$C_6$ ($r_{I6}=13.2$, $r_{II6}=11.9$, $r_{III6}=71.1$)

for $6.2 \leq r_w < 8.6$, this polygon is a pentagon of vertices:

$C_1$ ($r_{I1}=13.1$, $r_{II1}=1.4$, $r_{III1}=79.3$)
$C_2$ ($r_{I2}=29.1$, $r_{II2}=1.4$, $r_{III2}=63.3$)
$C_3$ ($r_{I3}=31.1$, $r_{II3}=5.6$, $r_{III3}=57.1$)
$C_4$ ($r_{I4}=22.7$, $r_{II4}=18.7$, $r_{III4}=52.4$)
$C_5$ ($r_{I5}=13.3$, $r_{II5}=10.1$, $r_{III5}=70.4$).

Advantageously, the degree of polymerization DP of the cellulose in the cellulose derivative or derivatives is at least equal to 200 and at most equal to 1200, and in each interval $r_{wi} < r_w \leq r_{wj}$ for each value of $r_{wj}$, that is to say when one has the relationship $r_I+r_{II}+r_{III}=1-r_{wj}$, a polygon is defined comprising a number of vertices which may vary from one interval to the other, each of these vertices being referenced in general as $C_q$ (q being a variable) and being defined by its coordinates $r_{Iq}$, $r_{IIq}$, $r_{IIIq}$ in the ternary diagram corresponding to the value $r_{wj}$, that is to say in the ternary diagram of plane $r_{wj}$.

In each interval $r_{wi} < r_w \leq r_{wj}$, every point of the quaternary diagram of coordinates $r_I$, $r_{II}$, $r_{III}$, $r_w$ corresponding to a composition according to the invention is projected onto the plane $r_{wj}$ and perpendicular to said plane within the polygon of vertices $C_q$ or on the sides of this polygon.

These intervals $r_{wi} < r_w \leq r_{wj}$ and these polygons of vertices $C_q$ are given by the following relations, the values of $r_{wi}$, $r_w$, $r_{wj}$ and the values of the coordinates of the vertices $C_q$ being expressed in %:

for $0.0 < r_w \leq 1.4$, this polygon is a hexagon of vertices:

$C_1$ ($r_{I1}=11.0$, $r_{II1}=2.4$, $r_{III1}=85.2$)
$C_2$ ($r_{I2}$32 $35.8$, $r_{II2}=0.3$, $r_{III2}=62.5$)
$C_3$ ($r_{I3}=37.8$, $r_{II3}=9.4$, $r_{III3}=51.4$)
$C_4$ ($r_{I4}=27.5$, $r_{II4}=27.6$, $r_{III4}=43.5$)
$C_5$ ($r_{I5}=18.3$, $r_{II5}=29.6$, $r_{III5}=50.7$)
$C_6$ ($r_{I6}=12.5$, $r_{II6}=14.8$, $r_{III6}=71.3$)

for $1.4 < r_w \leq 3.8$, this polygon is a hexagon of vertices:

$C_1$ ($r_{I1}=11.8$, $r_{II1}=2.4$, $r_{III1}=82.0$)
$C_2$ ($r_{I2}=34.0$, $r_{II2}=0.7$, $r_{III2}=61.5$)
$C_3$ ($r_{I3}=36.6$, $r_{II3}=7.4$, $r_{III3}=52.2$)
$C_4$ ($r_{I4}=23.9$, $r_{II4}=24.4$, $r_{III4}=47.9$)

$C_5$ ($r_{I5}=20.7$, $r_{II5}=24.8$, $r_{III5}=50.7$)
$C_6$ ($r_{I6}=13.2$, $r_{II6}=11.9$, $r_{III6}=71.1$)
for $3.8 < r_w \leq 6.2$, this polygon is a pentagon of vertices:
$C_1$ ($r_{I1}=13.1$, $r_{II1}=1.4$, $r_{III1}=79.3$)
$C_2$ ($r_{I2}=29.1$, $r_{II2}=1.4$, $r_{III2}=63.3$)
$C_3$ ($r_{I3}=31.1$, $r_{II3}=5.6$, $r_{III3}=57.1$)
$C_4$ ($r_{I4}=22.7$, $r_{II4}=18.7$, $r_{III4}=52.4$)
$C_5$ ($r_{I5}=13.3$, $r_{II5}=10.1$, $r_{III5}=70.4$).

In all the above, the quaternary diagrams correspond in known manner to regular tetrahedrons, which have not been shown in the drawing for purposes of simplification.

Figure 4:
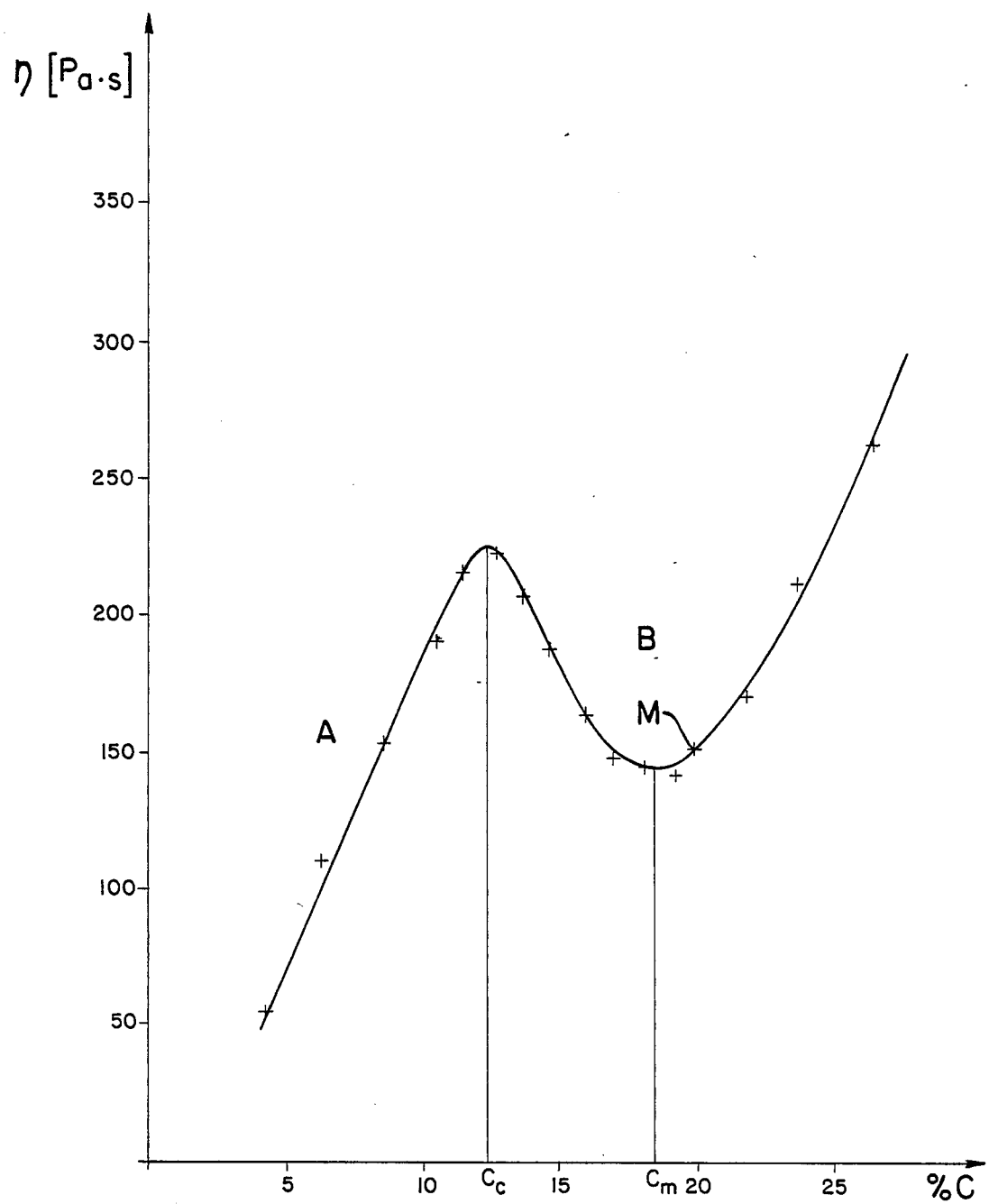
FIG. 4 is a crive showing the relationship between the viscosity of the composition and the concentration of cellulose derivative in said composition.

In general, the composition according to the invention is such that its concentration is greater than the critical concentration. By way of example, FIG. 4 shows, for a cellulose solution, the curve giving the relationship between the concentration of the cellulose derivative in this solution and the viscosity of this solution. The cellulose derivative is cellulose formate, its concentration in the solution (reference C) is expressed in percent by weight referred to the total weight of the solution. The dynamic viscosity (designated $\eta$) is expressed in pascal-seconds. It is seen that when the concentration of the derivative is less than the critical concentration $C_c$ (region A), the viscosity increases with the concentration and that when the concentration of the derivative is greater than this critical concentration (region B), the viscosity starts to decrease when the concentration increases, the region B corresponding to anisotropy. In this region B, the viscosity passes through a minimum at the concentration $C_m$.

On this curve, the reference point M corresponds to the composition of Test 7 of Example I-1 (Table 4); it is located in region B.

The process of the invention makes it possible to obtain a composition with only slight degradation of the initial cellulose, the relative variation of DP ($\Delta$ DP) being, for instance, most frequently less than 20% in the examples previously described.

Preferably, in the solution according to the invention the degree of substitution DS of the cellulose in formate groups of the cellulose derivative or derivatives is at least equal to 5.0% and the degree of substitution DS of the cellulose in other ester groups is zero or less than 15.0%.

II. ARTICLES OF CELLULOSE DERIVATIVES

A. Apparatus and Method of Production

1. Preparation of the spinning solutions:

The solutions can be prepared in any mixer which is thermostatically controlled in suitable manner and preferably permits operation in a vacuum. If the mixer does not afford the possibility of producing a vacuum, it is necessary to subsequently degasify the spinning solution by some suitable means.

In order to produce a spinning solution according to the process of the invention, the following manner of operation can, for example, be used. A double-jacket reactor is used having an inside volume of about 4 liters. Material (II) and material (III) are first of all introduced into this reactor and are homogenized by agitation. Material (I) is then added without agitation, whereupon a vacuum is formed in the reactor, this vacuum being of about 5 to 10 mbar (500 to 1000 Pa). The agitation is turned on and the esterification and dissolving action starts at this moment. The temperature of the mixture during the agitation is preferably between 5° and 20° C.

It should be noted that other methods would be possible. One could, for instance, prepare a pre-solution by allowing material (I) to become impregnated with material (II), cooling this mixture (preferred temperature: −15° to 0° C.) and adding material (III) in solid form, the entire quantity being then homogenized so as to obtain a pre-solution which is in solid form, this pre-solution being then agitated between 5° and 20° C. as previously described in order to bring about the esterification and dissolving reaction.

One could also prepare the solution by using a single-screw or multiple-screw extruder, the base materials being, for instance, introduced continuously into this extruder and the preparation taking place preferably under vacuum.

2. Spinning of the solutions to produce fibers.

The solutions obtained by the process described in Section 1 above are used directly to produce fibers without preliminary extraction of the cellulose derivative. The spinning technique used is the so-called "with air gap" (dry jet-wet) technique described, for instance, in U.S. Pat. No. 3,414,645. The spinning pump is fed with the solution, which can, for instance, come directly from the dissolving reactor. The solution is then extruded through a nozzle provided with orifices. The face of the nozzle is located horizontally at a distance above the surface of the coagulation bath which may range from a few millimeters to several centimeters. Before entering the coagulation bath, the jet is drawn out in the layer of air in order to orient the molecules in the flow and prepare the mechanical properties before the coagulation. The fiber of cellulose derivative is formed within the coagulation bath. The coagulation bath must be capable of precipitating the cellulose material and dissolving the organic and inorganic acid materials. The coagulation bath preferably has a base of acetone within a temperature range varying between 10° C. and −20° C. At the outlet from the coagulation bath, the spun product, which comprises a plurality of filaments, is taken up on a drive device. The ratio between the velocity of the spun product on the drive device and the velocity upon emergence from the dieplate defines the spinning stretch factor (S.S.F.).

It should be noted that the invention applies to cases in which non-coagulant fluids other than air are used in the so-called "air gap" technique, for instance nitrogen or other gases, and that the invention applies to cases in which other spinning techniques are used, for instance wet spinning techniques.

B. Determination of the Characteristics of the Articles

1. Mechanical properties of the spun articles

The expression "spun articles" as used herein covers all articles made by spinning, while the specific term "spun yarn" used as substantive covers only an assembly of filaments obtained by the very operation of spinning through the dieplate itself.

By "conditioning" there is understood herein the treatment of the spun articles in accordance with Federal Republic of Germany Standard DIN 53802-20/65 of July 1979.

The titer of the spun yarns is determined in accordance with Federal Republic of Germany Standard DIN 53830 of June 1965, the spun yarns being previously conditioned. The measurement is effected on at least three samples, each corresponding to a length of 50 m, by weighing that length of spun yarn.

The titer of the filaments is measured by vibration of the individual filaments by detecting the resonance frequency of the individual filament subjected to a given tension, on the order of 0.5 cN/tex. The absolute error is less than 0.01 decitex.

The mechanical properties of the spun yarns are measured by means of a traction machine manufactured by Zwick GmbH & Co (Federal Republic of Germany) of type 1435, corresponding to Federal Republic of Germany Standard DIN 51220 of October 1976 and DIN 51221 of August 1976, in accordance with the manner of operation described in German Federal Standard DIN 53834 of January 1979. The spun yarns are imparted for the measurement a protective twist of 100 turns/m and they are then subjected to traction over an initial length of 400 mm. All the results are obtained as the average of 10 measurements.

The mechanical properties of the filaments are measured by means of a Textechno (Federal Republic of Germany) traction machine of the FAFEGRAPH-T type, in accordance with the manner of operation set forth in Federal Republic of Germany Standard DIN 53816 of June 1976, the results being indicated as the average of 10 measurements.

The tenacity (T) and the initial modulus ($M_i$) are indicated in cN per tex. The elongation at rupture ($A_r$) is indicated in percentage. The initial modulus ($M_i$) is defined as the slope of the linear portion of the rupture force/elongation curve which takes place just after a prestress of 0.5 cN/tex.

Determination of the sonic modulus.

The velocity of propagation of sound in the fibers is determined by using a measuring apparatus of the PPM-5R "Dynamic Modulus Tester" type manufactured by the Morgan Co., Inc. of Cambridge, Mass.

The measurement samples are spun yarns which have been previously conditioned. The measurements are carried out in the same atmosphere as that of this conditioning. The spun yarn is subject to a preload of 5 cN/tex over a length of about 2 m. Two sensors of the MORGAN-WTRT-5 FB type are then applied against the spun yarns with a slight constant bearing pressure. The resonant frequency of the piezoelectric ceramics of the sensors is 5 kHz. L is the distance in meters between the two sensors. This distance is determined with an absolute error of less than one millimeter; "t" is the propagation time in seconds in order for the pulse emitted by the emitter sensor to reach the receiving sensor.

The relative error of the measurements is less than 3% for the propagation time "t". The sonic modulus $M_s$ is defined by the equation: $M_s = V^2 \times 10^{-4}$ cN/tex, V being the sound velocity (meters/second) given by the reciprocal of the slope of the linear regression determined for N different pairs of measurements of L and "t", N being at least equal to three.

2. Chemical properties of the spun articles

Degree of substitution (DS) and degree of polymerization (DP)

The spun article is conditioned at room temperature (for instance about 22° C.) and at the relative humidity of the room in which the determination of DS and DP are effected. The moisture content of the spun article is determined, for instance, by thermogravimetry.

The degree of substitutuion DS and the degree of polymerization DP of the cellulose of the cellulose derivative are determined in accordance with the same methods as defined above in Section I. C for the compositions, without extraction with acetone.

3. Physical properties of the spun articles 3.1 Optical properties

The optical anisotropy of the spun articles is observed and measured by means of a polarization microscope of Olympus BH2 type. In particular, the double refraction is determined by the method of the Berek compensator.

3.2 X-ray structure (a) Experimental apparatus and setup

Apparatus: The determinations are carried out on two types of apparatus:

A high-power generator (generator A). This is a Rigaku RU-200 PL system equipped with a rotating anode, operating under the following conditions: 40 kV, 200 mA; focus $0.5 \times 10$ mm$^2$ on the anode; point apparent focus $0.5 \times 1$ mm$^2$; radiation of copper with elimination of the KB line by filtration with a sheet of Ni and energy discrimination.

A conventional generator (generator B) of Siemens make, with sealed tube, operating under the following conditions: 40 kV, 30 mA; fine linear focus $0.04 \times 8$ mm$^2$; K$\alpha_1$ radiation of copper obtained by means of a CGR monochromatoor with curved crystal (R=1400 mm); focussing distance D=510 mm. CGR=Compagnie Générale de Radiologie of France.

These two generators are used to develop four different setups.

Experimental setups.

Setup 1: Rigaku SG-9R large angle goniometer (radius 250 mm) equipped with an Euler circle and a scintillation counter; scanning speed in $2\theta$: 2°/minute; speed of rotation of the Euler circle: 2°/minute at $2\theta$ fixed.

Selection at the collimation level of the x-ray beam.

Divergence: Point collimator diameter 1 mm;

Analysis: Crossed slits $0.9 \times 0.9$ mm$^2$ (angular opening $0.5° \times 0.5°$) located 110 mm from the plane of the sample.

Setup 2:

Rigaku SG-9R goniometer, equipped with a rotating sample holder (speed of rotation: 100 rpm) and a scintillation counter, operating step-by-step with an increment of 0.1° in $2\theta$.

Selection at the collimation level of the x-ray beam: Divergence slit 1/6°; diffusion slit: 1°; analysis slit 0.15 mm located 250 mm from the sample.

Setup 3:

Siemens large angle goniometer, equipped with an Euler circle and a scintillation counter. Speed of scanning 0.1°/minute in $2\theta$.

CGR monochromator, focal length 510 mm.

Analysis slit 0.4 mm at 155 mm from the sample.

Setup 4:

Rigaku SASG central diffusion goniometer equipped with a Leti type linear detector and an Ortec multichannel analyzer.

Selection of the collimation level of the x-ray beam: first slit $15 \times 0.1$ mm$^2$, second slit $15 \times 0.05$ mm$^2$ at 250 mm.

Sample-detector distance: 360 mm

Sample-second-slit distance: 105 mm.

Table 15 below shows the setup adopted, the angular range and the generator used as a function of the parameters measured.

TABLE 15

| Parameters measured | Setup adopted | X-ray diffraction angle | Generator used |
|---|---|---|---|
| Crystalline orientation index (I-O) | 1 | wide angles | A |
| Crystallinity index (I.C.) | 2 | wide angles | A |
| Apparent sizes | | | |
| longitudinal (T$_l$) transverse (T$_t$) | 3 | wide angles | B |
| Long period (L.P.) | 4 | small angles | A |
| Width at mid-height (ΔP) | 4 | small angles | A |
| Integrated intensity (I.I.) | 4 | small angles | A |

(b) Reflections used for the determination of the different structural parameters by wide angle diffraction The photographs of the phenomenon of diffraction of the x-rays by the fibers considered shows a certain number of arcs on the meridian, on the equator and outside of these two axes. The characteristics of these arcs are related to the structural characteristics of the material.

The angular aperture of a meridian arc such as that located at the diffraction angle $2\theta$ of about 34.7° is related to the statistical orientation of the crystallites with respect to the fiber axis. It is this reflection at about 34.7° in $2\theta$ which is selected to determine an orientation index I-O and an apparent longitudinal size of crystallites, $T_1$.

On the equator, an arc is used which is located at about 11° in $2\theta$ in order to determine an apparent transverse size of crystallites $T_t$.

If specific reflections are used for the parameters designated above, the determination of a crystallinity index requires that the entire diffractogram be taken into account.

(c) Methods used for the measurement of the different parameters

All the measurements are carried out on one or more fibers, each formed of several filaments which are parallel to each other, that is to say not twisted.

Index of crystalline orientation (I-O)

The crystalline orientation can be characterized by the angle between the fiber axis and the normal to the diatropic planes.

The measurement of the azimuthal aperture of the meridian arc located at about $2\theta = 34.7°$ gives a direct indication of the degree of orientation of the crystallites with respect to the fiber axis.

An orientation index can be defined on basis of the formula:

$$I.O. = \frac{180 - \alpha}{180} \times 100$$

in which $\alpha$ is the total width at mid-height of the curve obtained by an azimuthal scanning; $\alpha$ is expressed in degrees.

Index of crystallinity (I-C)

A relative crystallinity index is determined in accordance with the method of Wakelin (Journal of Applied Physics, Vol. 30 No. 11, page 1654, November 1959).

Before comparing the x-ray diffraction diagram of any sample with that of two standards, one considered as 100% amorphous and the other as 100% crystalline, the rough experimental values are corrected for various parameters, counting rate, stability of the x-ray beam, diffusion due to the air, effects of polarization and absorption.

The diagram are then standardized, before being studied by the so-called "correlative" method.

The indices of crystallinity obtained are a function, of course, of the selection of the amorphous and crystalline standards. These standards were prepared in the following manner:

Crystalline standard: Obtained by an acid treatment of a fiber regenerated from cellulose formate already having a strong crystallinity (24 hours in a normal aqueous solution of hydrochloric acid at 60° C.).

Amorphous standard: Amorphous cellulose formate.

Figure 5:
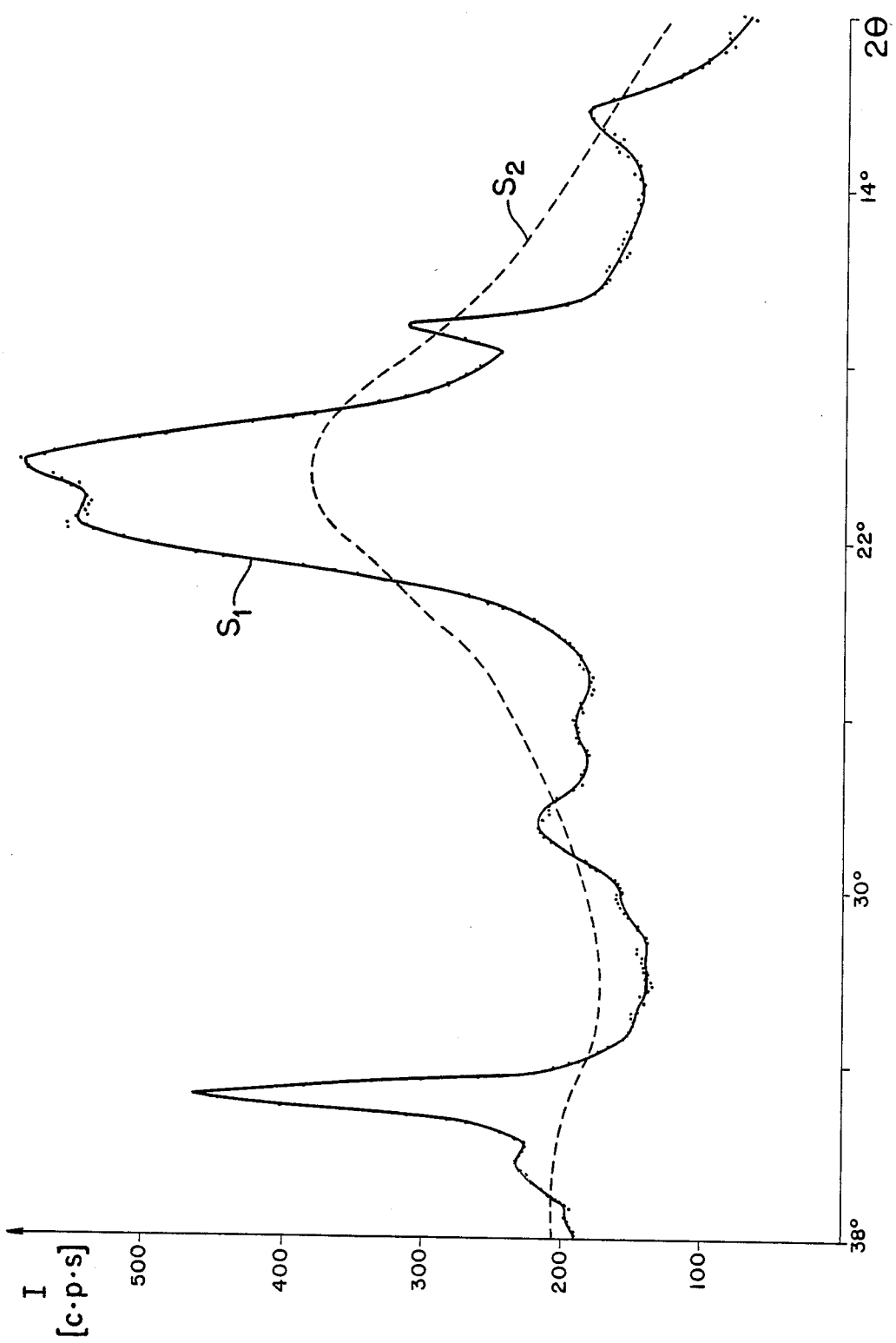
FIG. 5 shows the characteristic spectra of two standards used for fiber x-ray measurements in accordance with the invention.

The characteristic spectra of these two standards appear in FIG. 5. In FIG. 5 the spectrum $S_1$ corresponding to the crystalline standard is represented in the form of a solid line and the spectrum $S_2$ corresponding to the amorphous standard is represented in the form of a dashed line. For these spectra, the abscissa axis corresponds to the angle $2\theta$ in degrees and the ordinate axis corresponds to the corrected intensity I, expressed in pulses per second (c.p.s.).

The spectra are recorded in transmission on a "rotating sample" of $2\theta = 10°$ to $2\theta = 38°$. By "rotating sample" there is understood a layer of contiguous parallel fibers, this layer turning around an axis which is perpendicular to it, doing so during the exposure under the beam of x-rays.

Apparent size of the crystallites

The Debye-Scherrer formula permits the calculation of the apparent dimension of the crystallites in a direction related to the selection of the reflection scanned. A scanning as a function of $2\theta$ along the meridian of the reflection located at about 34.7° provides a curve of the diffracted intensity as a function of the angle $2\theta$. The width at mid-height of the profile, namely $\beta o$, expressed in radians, makes it possible to have access to the apparent longitudinal size of the crystallites ($T_1$) by the equation $$T_1 = \frac{\lambda}{\sqrt{\beta_o^2 - \beta^2} \cos \theta}$$

$\beta$ coresponding to an "instrument width" determined on basis of the diffraction on a hexamethylene tetramine powder.

The angle $\theta$ is one-half of the angle $2\theta$ corresponding to the maximum of the profile. $\lambda$ is the wavelength of the x-radiation used.

The same procedure, applied to an equatorial scanning at the level of the reflection located at about 11°$2\theta$ on the equator, makes it possible to supply an apparent transverse size of the crystallites ($T_t$). An increase in the apparent size of the crystallites must be considered the result of an increase in the actual size and/or an improvement of the local order.

Long period

An x-ray central diffusion experiment on organic fibers may show in a photograph a diffusion around the incident direct beam, elongated along the equator, and two diffraction spots at small angles, on both sides of the central diffusion, on the meridian. This possible diffraction phenomenon in small angles is due to the existence of a periodicity of the electron density in the material studied. We characterized this periodicity by the quantity L.P.$=\lambda/\sin\epsilon$ in which $\lambda$ is the wavelength of the x-radiation and $\epsilon$ the angle $2\theta$ along the meridian, corresponding to the maximum intensity for the diffraction.

The recording of the intensity of this diffraction at small angles along the meridian as a function of $\epsilon$ supplies a curve whose width at mid-height $\Delta\phi$ is representative of the regularity of the periodicity and the area below the curve (integrated intensity) is representative of the amplitude of the periodic phenomenon. The possible long period phenomenon is characterized by the parameters L.P., $\Delta\phi$, I.I.

3.3 Morphology

The morphological properties of the spun articles are determined by optical microscopy and scanning electron-microscopy.

C. Examples

The examples which follow describe the production of fibers of esterified cellulose obtained by the process previously described under Section A.1, with possible reference to Tables 1 and 3 above. In all these examples, the references $R_I$, $R_{II}$, $R_{III}$, $R_{wr}$ have the same meaning and are calculated in the same manner as previously described. The spinning is effected in the manner described in Section A.2 above.

Example II.1

A mixture is formed from the following base materials:

Material (I): Cellulose material containing 99.3% by weight holocellulose (45.7% by weight α-cellulose and 53.6% by weight hemicelluloses).

Material (II): Formic acid (Table 3, product 22).

Material (III): Orthophosphoric acid (Table 3, product 23).

Upon the preparation of the mixture one has the relations:

$R_I = 19.8\%$; $R_{II} = 18.1\%$; $R_{III} = 61.05\%$; $R_{wr} = R_w = 1.05\%$.

At the end of 20 minutes, a solution is obtained having the following constitution:

Cellulose derivative (cellulose formate): 23.65% by weight; organic acid (formic acid): 11.8% by weight; inorganic acid (orthophosphoric acid): 61.05% by weight; water: 3.5% by weight. The solution is anisotropic.

From the dissolving reactor the solution is introduced directly into the spinning pump.

From the pump the solution is extruded through a nozzle having 100 orifices each of a diameter of 0.005 cm. The nozzle is located 2 cm above the coagulation bath which consists of acetone at −17° C. On the drive device, the fiber has a speed of 90 meters/minute, which corresponds to a S.S.F. of 4.5. The bobbin obtained is washed in water and then dried in air. In this way there is obtained a spun yarn consisting of 100 filaments, the fiber being constituted by this spun yarn.

Example II-2

A mixture is prepared from the following base materials:

Material (I): Cellulose material containing 99.3% by weight of holocellulose (52.2% by weight α-cellulose and 47.1% by weight of hemicelluloses).

Material (II) and (III): Same as for Example II-1.

Upon the preparation of the mixture, one has the relations:

$R_I = 19.8\%$; $R_{II} = 18.1\%$; $R_{III} = 61.05\%$; $R_{wr} = R_w = 1.05\%$.

At the end of 20 minutes an anisotropic solution is obtained having the following constitution: Cellulose formate: 24.05% by weight; formic acid: 11.1% by weight; orthophosphoric acid: 61.05% by weight; water: 3.8% by weight.

A fiber is produced with this solution in accordance with Example II-1 above.

Example II-3

A mixture is prepared by introducing into the reactor 368.6 g of partially dried material $C_1$ (Table 1), 442.6 g of formic acid (Table 3, product 22) and 1500 g of orthophosphoric acid (Table 3, product 23).

Upon the preparation of the mixture, one has the relations:

$R_I = 15.85\%$; $R_{II} = 19.0\%$; $R_{III} = 64.05\%$; $R_{wr} = R_w = 1.1\%$.

At the end of 20 minutes there is obtained an anisotropic solution having the following constitution (% by weight): cellulose formate: 19.6%; formic acid: 12.85% orthophosphoric acid: 64.05%; water: 3.5%.

A fiber is prepared with the solution in accordance with Example II-1 above.

Example II-4

A solution is prepared in a manner similar to Example II-2 with the difference that when the mixture is prepared one has the relations:

$R_I = 23.75\%$; $R_{II} = 17.2\%$; $R_{III} = 58.0\%$ $R_{wr} = R_w = 1.05\%$.

At the end of 20 minutes an anisotropic solution is obtained having the following constitution (% by weight): cellulose formate (28.5%); formic acid: 9.4%; orthophosphoric acid: 58.0%; water: 4.1%. A fiber is prepared with this solution in accordance with Example II-1 above, with the following differences: speed of winding on the drive device: 81 meters/minutes, S.S.F. = 5.4

Example II-5

A mixture is prepared from the following base materials:

Material (I): Cellulose material containing 99.4% by weight of holocellulose (91.3% by weight of α-cellulose and 8.1% by weight of hemicelluloses).

Material (II) and (III): Same as for example II-1.

Upon the preparation of the mixture one has the relations:

$R_I = 15.85\%$; $R_{II} = 19.0\%$; $R_{III} = 64.05\%$; $R_{wr} = R_w = 1.1\%$.

At the end of 90 minutes an anisotropic solution is obtained having the following constitution (% by weight): cellulose formate: 19.35%, formic acid: 13.25%; orthophosphoric acid: 64.05%; water: 3.35%. Fibers are produced with this solution in accordance with Example II-1 above with the following differences: Speed of the drive device: 90 meters/minute; S.S.F. 3.6.

Example II-6

A mixture is prepared from the following base materials:

Material (I): Cellulose material containing 99.1% by weight of holocellulose (89.4% by weight of α-cellulose and 9.7% by weight of hemicelluloses).

Materials (II) and (III): Same as for Examples II-1.

Upon the preparation of the mixture one has the relations:

$R_I = 19.75\%$; $R_{II} = 18.1\%$, $R_{III} = 61.05\%$; $R_{wr} = R_w = 1.1\%$.

At the end of 90 minutes, an anisotropic solution is obtained having the following constitution (% by weight): Cellulose formate: 24.95%; formic acid: 9.6%; orthophosphoric acid: 61.05%; water: 4.4%. A fiber is formed with this solution in accordance with Example II-1.

Example II-7

A solution is prepared under the same conditions as in Example II-2 but using for material (II) a mixture of formic acid and acetic acid (Table 3, products 22 and 3), the ratio of weight of formic acid to weight of acetic acid being equal to 9, the ratio $R_{II}$ having the same value as in Test II-2. At the end of 30 minutes, there is obtained an anisotropic solution having the following composition (% by weight): cellulose acetoformate: 23.45%; mixture of formic acid and acetic acid: 12.1%; orthophosphoric acid: 61.05%; water: 3.4%. The expression "cellulose acetoformate" covers a mixed ester of cellulose having formate and acetate groups. From this solution, a fiber is prepared by the method of Example II-1.

Example II-8

A mixture is formed from the following base materials:

Material (I): Cellulose material containing 97.4% by weight of holocellulose (95.1% by weight of α-cellulose and 2.3% by weight of hemicellulose).

Materials (II) and (III): Same as for Example II-1.

Upon the preparation of the mixture, one has the following ratios:

$R_I = 15.55\%$; $R_{II} = 19.0\%$ $R_{III} = 64.05\%$; $R_{wr} = 1.4\%$.

After passage through a double-screw mixer one obtains at the end of 30 minutes, an anisotropic solution the composition of which is as follows (% by weight): cellulose formate: 18.85%; formic acid: 13.6%; orthophosphoric acid: 64.05%; water: 3.5%. A fiber is produced from this solution in accordance with Example Ii-1, the solution having been previously degasified for 30 minutes under vacuum.

Example II-9

A mixture is prepared from the following base materials:

Material (I): Cellulose material containing 98.7% by weight of holocellulose (89% by weight of α-cellulose and 9.7% by weight of hemicelluloses).

Materials (II) and (III): Same as for Example II-1.

Upon the preparation of the mixture one has the following ratios:

$R_I = 19.7\%$; $R_{II} = 18.1\%$; $R_{III} = 61.05\%$; $R_{wr} = R_w = 1.15\%$

At the end of 90 minutes, there is obtained an anisotropic solution the composition of which is as follows (% by weight): Cellulose formate: 23.75%; formic acid: 11.4%; orthophosphoric acid: 61.05%; water: 3.8%. A fiber is produced from this solution in accordance with Example II-1.

In all the above examples II-1 to II-9, the cellulose of material (I) has a degree of polymerization DP of more than 150 and less than 1500 and the variation of DP upon the preparation of the compositions is always less than 20%.

The mechanical properties and the chemical characteristics of the spun articles are given in Table 16 which follows. The properties T, $A_r$, $M_i$, DP, DS were determined for all the tests, $M_s$ being determined for a majority of the tests.

In this table, the abbreviations used are as follows: F=spun yarn; $F_t$=filament; $T_i$=titer; T=tenacity; $A_r$=elongation at rupture; $M_i$=initial modulus; $M_s$=sonic modulus; DS=total degree of substitution of the cellulose, DP=degree of polymerization of the cellulose in the cellulose derivatives.

TABLE 16

| Example No. | Properties | | | | | | | |
|---|---|---|---|---|---|---|---|---|
| | Mechanical | | | | | | Chemical | |
| | $T_i$ (F) tex | $T_i$ ($F_t$) dtex | T cN/tex | $A_r$ (%) | $M_i$ cN/tex | $M_s$ cN/tex | DP | DS % |
| II-1F | 18,5 | | 24 | 2,3 | 1550 | 2570 | 167 | 37,3 |
| II-1 $F_t$ | | 1,96 | 30 | 3 | 2160 | | | |
| II-2 F | 19,7 | | 47 | 3,4 | 2330 | | 262 | 41,6 |
| II-3 F | 16,8 | | 41 | 3,3 | 2030 | 2814 | 246 | 45,6 |
| II-4 F | 19,9 | | 48 | 3,0 | 2430 | 3179 | 254 | 38,7 |
| II-5 F | 20,7 | | 56 | 4,2 | 2130 | 2812 | 380 | 42,6 |
| II-6 F | 20,6 | | 57 | 3,7 | 2410 | 3277 | 284 | 50,7 |
| II-6 $F_t$ | | 1,96 | 60 | 3,7 | 2780 | | | |
| II-7 F | 20,7 | | 46 | 3,6 | 2210 | 3041 | 256 | 35,3* |
| II-8 F | 16,9 | | 65 | 4,0 | 2390 | 3082 | 420 | 40,7 |
| II-8 $F_t$ | | 1,72 | 72 | 4,0 | 2780 | | | |
| II-9 F | 20,5 | | 58 | 3,7 | 2460 | 3720 | 326 | 39,8 |
| II-9 $F_t$ | | 2,13 | 64 | 3,7 | 2780 | | | |

*In the case of Example No. II-7 the DS relative to the formate groups is 34.4% and the DS relative to the acetate groups is 0.9%.

The physical properties of the spun articles obtained with Tests II-1 to II-9 are summarized in Table 17 below. The characteristics Δn was determined for all the tests, the other physical properties being determined for a majority of the tests.

In this table the abbreviations used have the following meaning: Δn=double refraction; I.O.=index of crystalline orientation; I.C.=index of crystallinity; $T_l$=longitudinal size of the crystallites; $T_t$=transverse size of the crystallites.

TABLE 17

| Example No. | Physical Properties | | | | |
|---|---|---|---|---|---|
| | Δn | I.O. (%) | I.C. (%) | $T_l$ Å | $T_t$ Å |
| II-1 | 0.0379 | | | | |
| II-2 | 0.0400 | 92.00 | | 130 | 35 |
| II-3 | 0.0365 | 91.35 | 49 | 123 | 32 |
| II-4 | 0.0404 | 92.65 | 55 | 130 | 37 |
| II-5 | 0.0325 | 92.10 | 54 | 132 | 31 |
| II-6 | 0.0400 | 93.20 | 54 | 144 | 36 |
| II-7 | 0.0400 | 92.55 | 51 | 142 | 31 |
| II-8 | 0.0400 | | | | |
| II-9 | 0.0389 | | | | |

REMARKS ON TESTS II-1 TO II-9

All these tests are in accord with the invention. An examination under a polarization microscope of the filaments constituting the spun yarns obtained in these examples shows that each of these filaments has a complex morphology which varies from the edge towards the center. One such filament 1 is shown diagrammatically in FIGS. 6 and 7.

Figure 6:
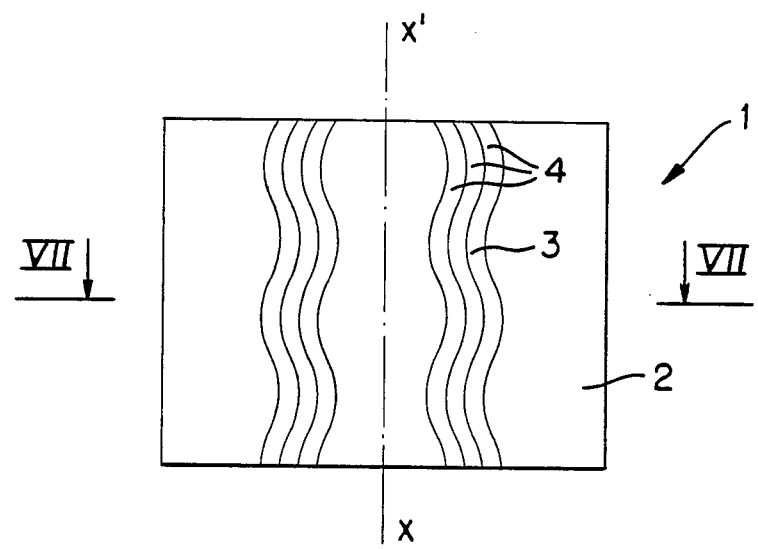
FIG. 6 shows diagrammatically a section through a filament in accordance with the invention, this section being taken along a plane containing the axis of the filament.
Figure 7:
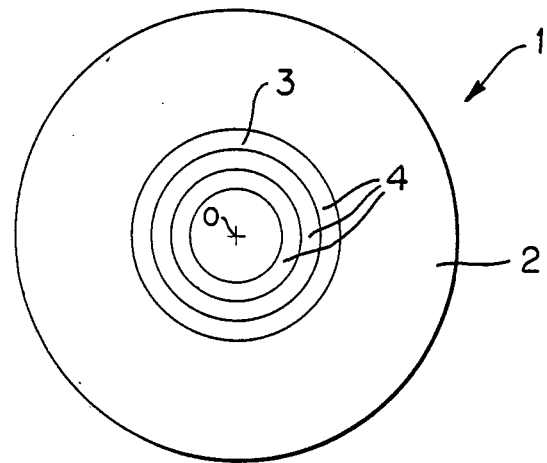
FIG. 7 shows diagrammatically a cross-section of the filament shown in FIG. 6, this section being taken along a plane perpendicular to the axis of the filament, which plane is indicated diagrammatically by the line VII-—VII in FIG. 6.

FIG. 6 is a section through this filament 1 along any plane containing the axis xx' of this filament, assumed linear, and FIG. 7 is a cross section through this filament 1 along any plane perpendicular to said axis xx', which is indicated diagrammatically by the letter O in FIG. 7. The filament 1 has an outer zone 2 known as the "skin" and an inner zone 3 known as the "heart." Under a polarization microscope, the skin 2 shows a uniform morphology similar to that of a rayon filament, for instance. The heart 3, on the other hand, with the likeness of a heart of palm, is composed of a succession of layers 4, these layers being practically concentric in a plane perpendicular to the axis xx′, as shown in FIG. 7. The filament 1 is therefore formed, at least in part, by layers embedded in each other, these layers surrounding the axis of the filament. The layers 4, whose thickness is less than a micron, undulate in the plane of FIG. 6 in a direction parallel to the axis xx′. In each layer the optical axis (optical direction) and the direction of crystallization vary in space pseudoperiodically in the direction of the axis xx′. These directions are not shown in the drawing, for purposes of simplification.

The fibers obtained have T and $M_i$ values which satisfy the equations given in the definition of the fiber of cellulose derivative(s) according to the invention.

The relations are in fact as follows: $DS \geq 2\%$; $150 < DP < 1500$; $T > 20$; $M_i > 1000$, T and $M_i$ being expressed in cN/tex.

These fibers therefore have high mechanical properties, this being true immediately upon their shaping, without additional drawing after spinning.

These findings continue as long as the degree of substitution DS of the cellulose in formate groups is at least equal to 2%, these values of DS being obtained, for instance, by partial regeneration of the cellulose from cellulose derivatives.

The following facts are furthermore noted in Examples II-1 to II-9;

The double refraction $\Delta n$ is high, since it is above 0.03.

No long-period phenomenon can be shown by analysis of the fibers under x-rays.

Preferably, in the fibers according to the invention, the degree of substitution DS of the cellulose in formate groups is at least equal to 30.0% and at most equal to 70.0% and the degree of substitution DS of the cellulose in other ester groups is zero or less than 10.0%.

Preferably in the fibers according to the invention, the degree of polymerization DP of the cellulose of the cellulose derivative or derivatives is at least equal to 200 and at most equal to 1200.

It is possible to produce films of cellulose derivatives from compositions according to the invention by using known processes, for instance by spinning using slit nozzles or by casting.

When the degree of substitution DS of the cellulose in formate groups is less than 2%, the fibers are then referred to as "regenerated cellulose fibers," Chapter III below giving examples of such regenerated cellulose fibers.

III. Articles of Regenerated Cellulose

A. Apparatus and Method of Preparation

The preparation of the solutions and the spinning of these solutions are carried out as in Chapter II above, but using a nozzle having a slot when it is desired to produce a film. The regeneration of the cellulose by at least partial saponification from spun articles can be effected either intermittently, for instance by immersing a bobbin of fibers or films of cellulose formate into a regeneration bath, or continuously, for instance by continuously passing these fibers or films into a regeneration bath. This bath is, in particular, an aqueous solution of sodium-hydroxide (NaOH), the concentration of the hydroxide in this solution varying, for instance, from 4 to 5% by weight. In intermittent operation, the regeneration time is a function of the thickness of the bobbin and may vary between several hours and several days. In continuous operation, the regeneration time is substantially faster, on the order of a minute or less. In both cases, the regeneration solution is, for instance, at room temperature.

B. Determination of the Properties of the Articles

The methods used are the same as those previously described under Section II-B, with the following differences:

The determination of the apparatus transverse size of the crystallites $T_t$ is effected by using an arc located at about 12.3° in 2 $\theta$.

The mechanical properties of the films are determined with a tensile machine identical to the one used for the spun fibers, in accordance with Federal Republic of Germany Standard DIN 53455 of April 1968.

The determination of the degree of substitution DS of the spun articles is effected in the following manner: The spun article is conditioned as described in Section II-B at the ambient temperature and ambient humidity of the room where the determination of the DS is effected. The water content of the spun article is determined, for instance, by the Karl Fisher technique. 2 g of the spun article are then weighed out and this quantity of material is washed with 50 cc of distilled water. The washing lasts 15 minutes during which the material of the spun article is placed in agitation. This material is then withdrawn, rinsed with portions of 10 cc of distilled water, and centrifuged. To this material of the spun article there are added 10 cc of distilled water and 10 cc of decinormal aqueous sodium hydroxide solution (0.1N NaOH) plus 10 cc of water. The material is agitated in this medium under nitrogen at room temperature for 15 minutes. The material is withdrawn, centrifuged, washed with 20 cc of water and rinsed with 160 cc of ethanol so as to obtain an ethanol/water solution having a ratio of about 80:20, this solution therefore no longer containing the material of the spun article. A potentiometric determination is then carried out on this solution with decinormal hydrochloric acid (0.1N HCl) in ethanol by means of electrodes adapted to the ethanol/water medium. Based on the characteristic increase in potential of the sodium formate, the amount of formate formed is determined and thus one has the value of DS defined in accordance with Chapters I and II.

C. Examples

Example III-1

A fiber of cellulose formate is formed in accordance with Example II-1. The fiber obtained is wound on a perforated bobbin which is immersed for 24 hours in an aqueous solution containing 4% by weight of sodium hydroxide so as to effect the saponification of the formate and the regeneration of the cellulose. The bobbin is then washed in water and the fiber dried on the bobbin.

Example III-2

A cellulose formate fiber is prepared according to Example II-2 and the cellulose of said fiber is regenerated as described in Example III-1, except that the fiber is dried by causing it to circulate continuously by unwinding from the bobbin, within a hot-air tunnel. After conditioning, the water content of the fiber is 10.3%. This water content is measured in accordance with ASTM standard D 2654-76 (1976).

Example III-3

A fiber of cellulose formate is prepared in accordance with Example II-3 and the cellulose of said fiber regenerated in the manner described in Example III-2.

EXAMPLE III-4

A fiber of cellulose formate is prepared in accordance with Example II-4 and the cellulose of this fiber regenerated in the manner described in Example III-2.

Example III-5

A fiber of cellulose formate is produced in accordance with Example II-5 but with a speed of the drive device of 90 meters per minute and a S.S.F. equal to 4.5. The cellulose of this fiber is regenerated in the manner described in Example III-2.

Example III-6

A cellulose formate fiber is produced in accordance with Example II-6 and the cellulose of said fiber regenerated in the manner described in Example III-2.

Example III-7

One proceeds as in Example III-6 but with a speed of the drive device equal to 80 meters per minute, the S.S.F. being equal to 8.

Example III-8

A mixture is formed in a manner similar to Example II-1 but with the following material (I): cellulose material containing 97.5% by weight of holocellulose (95.2% by weight of α-cellulose and 2.3% by weight of hemicelluloses); materials (II) and (III) are then same as for Example II-1.

Upon the preparation of the mixture one has the relations:
$R_I = 15.5\%$; $R_{II} = 19\%$; $R_{III} = 64.05\%$;
$R_{wr} = R_w = 1.4\%$.

At the end of 30 minutes, one obtains an anisotropic solution the composition of which is as follows (% by weight): cellulose formate: 18.95%; formic acid: 13.4%; orthophosphoric acid: 64.05%; water: 3.6%.

A fiber is produced in accordance with Example II-1 but with a speed of the drive device of 90 meters per minute and a S.S.F. of 6.6.

The cellulose of this fiber is regenerated as described in Example III-2.

EXAMPLE III-9

A cellulose formate fiber is produced in accordance with Example II-9 but with a speed of the drive device of 90 meters per minute and a S.S.F. of 9. The cellulose of this fiber is regenerated in the manner described in Example III-2.

Example III-10

A mixture is prepared in a manner similar to Example II-1 but with the following material (I): cellulose material containing 97.4% by weight of holocellulose (95.1% by weight of α-cellulose and 2.3% by weight hemicelluloses). Materials (II) and (III) are the same as in Example II-1. Upon the production of the mixture one has the following relations:

$R_I = 6.2\%$    $r_{II} = 21.2\%$;    $R_{III} = 71.35\%$;
$R_{wr} = R_w = 1.25\%$.

This example is therefore not in accord with the invention. At the end of 90 minutes one obtains an isotropic solution the composition of which is as follows (% by weight): cellulose formate: 7.45% formic acid: 19.15%; orthophosphoric acid: 71.35%; water: 2.05%. A fiber is produced in accordance with Example II-1 but with a speed of the drive device of 93 meters per minute and a S.S.F. of 1.5. The cellulose of this fiber is regenerated as in Example III-2.

Example III-11

This example illustrates the possibility of producing films according to the invention. A solution is prepared in accordance with Example II-4. This solution is spun, using a nozzle provided with a rectangular slot (10 mm × 0.15 mm). The speed of the drive device is 20 meters per minute and the draw ratio is 8. The cellulose of this film is regenerated in the manner described in Example III-1.

Example III-12

A fiber of cellulose acetoformate is produced in accordance with Example II-7. This fiber is regenerated continuously for 20 seconds in an aqueous solution containing 5% by weight, of sodium hydroxide so as to effect the saponification of the formate and not that of the acetate. The bobbin obtained is washed and dried according to Example III-2.

Example III-13

A mixture is prepared similar to Example II-1 but with the following material (I): cellulose material containing 97.3% by weight of holocellulose (95.0% by weight of α-cellulose and 2.3% by weight of hemicelluloses). Materials (II) and (III) are the same as for Example II-1. Upon the preparation of the mixture, one has the relations:
$R_I = 17.85\%$; $R_{II} = 18.5\%$; $R_{III} = 62.2\%$;
$R_{wr} = R_w = 1.45\%$.

At the end of 30 minutes one obtains an anisotropic solution whose composition is as follows (% by weight): cellulose formate: 21.4%; formic acid: 12.7% orthophosphoric acid: 62.2%; water: 3.7%. A fiber is prepared according to Example II-1 but with a speed of the drive device of 80 meters per minute and a S.S.F. of 14. The cellulose of this fiber is regenerated in the manner described in Example III-2.

Example III-14

A mixture is prepared in a manner similar to Example II-1 but with the following material (I): cellulose material containing 99.0% by weight of holocellulose (97.5% by weight of α-cellulose and 1.5% by weight of hemicelluloses). Materials (II) and (III) are the same as in Example II-1. Upon the preparation of the mixture one has the relations:
$R_I = 19.8\%$; $R_{II} = 17.8\%$; $R_{III} = 61,4\%$;
$R_{wr} = R_w - 1.08\%$.

At the end of 30 minutes one obtains an anisotropic solution whose composition is as follows (% by weight): cellulose formate: 23.7%; formic acid: 11.4%; orthophosphoric acid: 61.4% water: 3.5%.

A fiber is prepared according to Example II-1 but with a speed of the drive device of 45 meters per minute and a draw ratio of 5.6. The cellulose of this fiber is regenerated in the manner described in Example III-2.

All the tests are in accord with the invention except Test III-10. The mechanical properties and the chemical characteristics of the fibers and of the film obtained in Tests III-1 to III-14 are given in Table 18 below, the abbreviations of this table being the same as those used in Table 16 above, the additional abbreviation $F_m$ representing a film. In Table 18, the characteristics T, $A_r$, $M_i$, DP, DS have been determined for all the tests, the characteristic $M_s$ being determined in a majority of the tests.

TABLE 18

| | | | Properties | | | | | |
|---|---|---|---|---|---|---|---|---|
| | | | Mechanical | | | | Chemical | |
| Example No. | $T_j$ (F) tex | $T_j$ ($F_i$) dtex | T cN/tex | $A_r$ (%) | $M_i$ cN/tex | $M_s$ cN/tex | DP | DS (%) |
| III-1 $F_t$ | | 1,69 | 30 | 2,3 | 2300 | | 167 | <1 |
| III-2 F | 17,8 | | 60 | 4,0 | 2440 | 3249 | 250 | <1 |
| III-2 $F_t$ | | 1,68 | 70 | 4,5 | 2635 | | | |
| III-3 F | 14 | | 56 | 3,8 | 2300 | 3108 | 246 | <1 |
| III-4 F | 17,1 | | 64 | 3,5 | 2645 | 3543 | 245 | <1 |
| III-5 F | 13,2 | | 83 | 4,0 | 3000 | 3748 | 380 | <1 |
| III-5 $F_t$ | | 1,23 | 90 | 4,4 | 3400 | | | |
| III-6 F | 17,6 | | 68 | 3,6 | 2860 | 3930 | 284 | <1 |
| III-7 F | 10,3 | | 73 | 3,8 | 3030 | 4180 | 284 | <1 |
| III-8 $F_t$ | | 1,03 | 107 | 4,3 | 3910 | | 504 | <1 |
| III-9 F | 8,5 | | 77 | 3,5 | 3190 | 4240 | 326 | <1 |
| III-9 $F_t$ | | 0,875 | 86 | 3,2 | 3840 | | | |
| III-10 F | 15 | | 35 | 4,0 | 1890 | 2600 | 366 | <1 |
| III-11 $F_m$ | 111 | | 29 | 2,8 | 1870 | | 250 | <1 |
| III-12 F | 17,6 | | 50 | 3,5 | 2120 | 3600 | 256 | *$A_c$:0,80 F:1,03 |
| III-13 F | 4,5 | | 97 | 3,75 | 3285 | | 490 | <1 |
| III-14 F | 15,4 | | 98,2 | 3,9 | 3140 | 4460 | 458 | <1 |

*$A_c$ = DS relative to the acetate groups;
F = DS relative to the formate groups.

The physical properties of the fibers obtained in the tests of Chapter III are given in Table 19 below, the abbreviations of this table being the same as those used in Table 17 above, with in addition: L.P.=long period; $\Delta\phi$=width at mid-height; I.I.=integrated intensity.

In Table 19, the characteristic $\Delta n$ has been determined for all the fibers, the other characteristics being determined for a majority of the fibers.

TABLE 19

| | | | Physical Properties | | | | |
|---|---|---|---|---|---|---|---|
| Test No. | $\Delta n$ | I.O. (%) | L.P. (Å) | $\Delta\phi$ (°) | I.I. (arbitrary unit) | I.C. (%) | $T_l$ (Å) | $T_t$ (Å) |
| III-1 | 0,0461 | | | | | | | |
| III-2 | 0,0545 | 95,80 | 178 | 0,34 | 1000 | 81 | 183 | 52 |
| III-3 | 0,0511 | 95,70 | 178 | 0,34 | 950 | 85 | 204 | 54 |
| III-4 | 0,0537 | 96,00 | 178 | 0,36 | 860 | 79 | 204 | 61 |
| III-5 | 0,0564 | 96,50 | 230 | 0,49 | 440 | 92 | 252 | 64 |
| III-6 | 0,0522 | 96,40 | 203 | 0,40 | 450 | 90 | 238 | 54 |
| III-7 | 0,0603 | 96,70 | 216 | 0,37 | 380 | 90 | 252 | 58 |
| III-8 | 0,0528 | | | | | | | |
| III-9 | 0,0577 | | | | | | | |
| III-10 | 0,0476 | 94,90 | >220 | | | 82 | 200 | 56 |
| III-12 | 0,0502 | | | | | | | |
| III-13 | 0,0580 | | | | | | | |
| III-14 | 0,0540 | 96,30 | 210 | 0,35 | 250 | 64 | 210 | 44 |

The fibers of regenerated cellulose obtained in Examples III-1 to III-9 and III-12 to III-14 are in accord with the invention and the fiber of regenerated cellulose obtained in Example III-10 is not in accord with the invention. All these fibers have a degree of substitution DS in formate groups of less than 2%.

In all Examples III-1 to III-9 and III-12 to III-14 according to the invention, the cellulose of material (I) and of the fibers has a degree of polymerization DP greater than 150 and less than 1500 and the variation in DP upon the production of the compositions is in all cases less than 20%.

Figure 8:
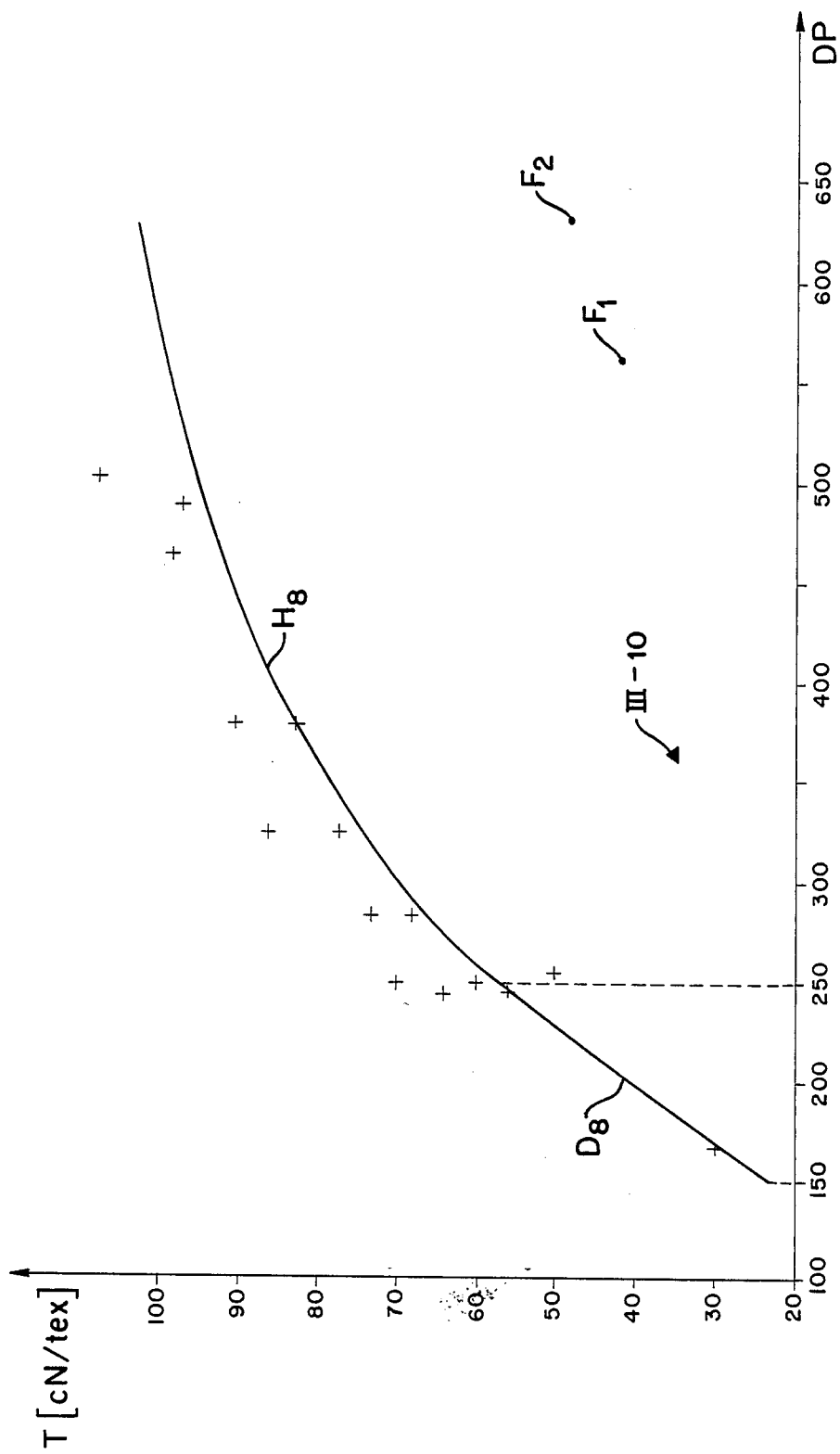
FIGS. 8 and 9 give values of the tenacity T (FIG. 8) and of the initial modulus $M_i$ (FIG. 9) as a function of the degree of polymerization DP of the cellulose for regenerated fibers in accordance with the invention.
Figure 9:
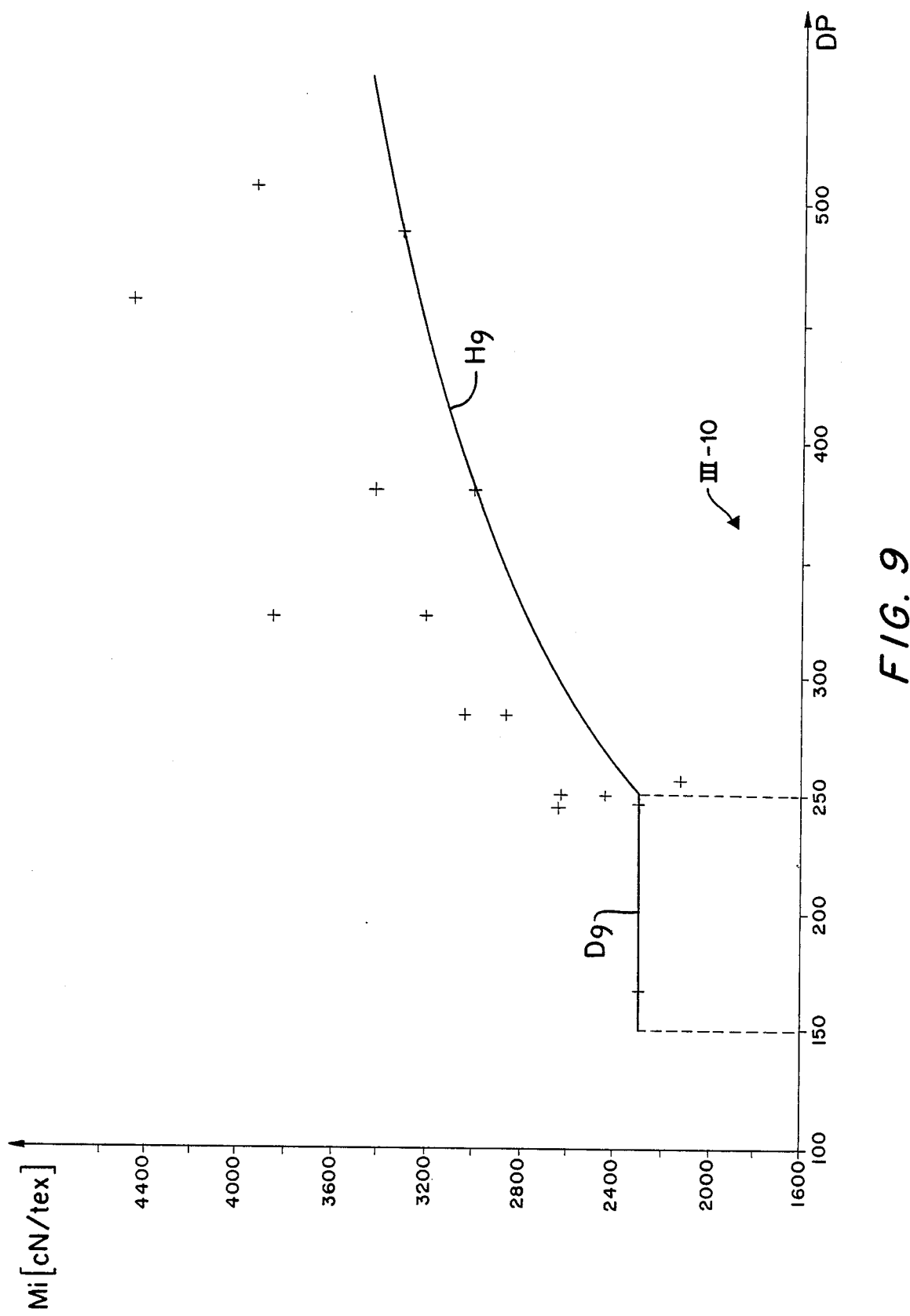

FIG. 8 shows the tenacity T of the fibers as a function of the degree of polymerization DP of the cellulose of these fibers and FIG. 9 shows the initial modulus $M_i$ of the fibers as a function of the degree of polymerization DP of the cellulose of these fibers. In FIGS. 8, 9, the abscissa axis corresponds to the DPs and the ordinate axis corresponds to T expressed in cN/tex (FIG. 8), or to $M_i$ expressed in cN/tex (FIG. 9), the values of DP, T and $M_i$ being given in Table 18 above. In these FIGS. 8 and 9 the fibers according to the invention are represented by crosses, these fibers according to the invention not bearing references in the drawing for purposes of simplification, while the fiber not in accord with the invention (Example III-10) is represented by a black triangle marked III-10. In FIG. 8, there are furthermore shown in the form of dots two known rayon fibers, these known fibers being marked $F_1$ and $F_2$ in the drawing. The properties of these known fibers are given in the following Table 20:

TABLE 20

| Properties | Fiber $F_1$ | Fiber $F_2$ |
|---|---|---|
| DP | 560 | 630 |
| T | 42 | 48 |
| $M_i$ | 800 | 1000 |

In the case of these known fibers, the properties T and $M_i$, expressed in cN/tex, are determined on the spun yarns.

FIGS. 8, 9 show that the fibers of regenerated cellulose in accord with the invention verify the following relationships:

for DP<200, we have T>20 and $M_i$>1800;
for 200≦DP<300, we have T>30 and $M_i$>2000;
for 300≦DP<400, we have T>40 and $M_i$>2400;
for 400≦DP<1500, we have T>60 and $M_i$>2600
T and $M_i$ being expressed in cN/tex.

It is furthermore noted from FIGS. 8 and 9 that all the fibers of regenerated cellulose according to the invention except the one of Example III-12 verify the following relations:

for $150 < DP < 250$, we have $T \geq \frac{1}{3} DP - 26$ and $M_i \geq 2300$;

for $250 \leq DP < 1500$, we have $T \geq -18675/DP + 132$ and $M_i \geq -502250/DP + 4309$, T and $M_i$ being expressed in cN/tex.

FIG. 8 shows a straight-line portion $D_8$ having the equation $T = \frac{1}{3} DP - 26$ and a hyperbolic portion $H_8$ having the equation $T = -18675/DP + 132$, these portions leading to a DP value of 250.

In FIG. 9 there is shown a straight-line portion $D_9$ of the equation $M_i = 2300$ and a hyperbolic portion $H_9$ of the equation $M_i = -502250/DP + 4309$, these portions leading to a DP value of 250.

The fibers not in accord with the invention which are entered in FIGS. 8, 9 do not verify all the said relations.

The substantial differences thus noted between the fibers of regenerated cellulose according to the invention and the fiber not in accord with the invention obtained in Example III-10 are explained by the following fact:

The fibers according to the invention are obtained from anisotropic solutions whose concentration of cellulose derivative is greater than the critical concentration;

the fiber of Example III-10 is obtained from an isotropic solution whose concentration of cellulose derivative is less than the critical concentration.

The expression "critical concentration" has been explained above.

A study of Table 18 shows, on the other hand, that the fibers of regenerated cellulose according to the invention have a high sonic modulus $M_s$ which is greater than 3000 cN/tex. It should be noted that the high level of the mechanical properties of the articles of the regenerated cellulose according to the invention is reached immediately after their shaping, that is to say without additional drawing.

A study of Table 19 furthermore shows the following facts for the fibers of regenerated cellulose according to the invention:

The index of orientation I.O. is high since it is greater than 95.5%.

There is noted the existence of a long-period phenomenon with the unexpected relationsip $T_1 \geq L.P.$ The fiber not in accord with the invention of Example III-10 does not have these characteristics.

Upon studying fibers of regenerated cellulose according to the invention with an optical microscope or with a scanning electron microscope, it is noted that the morphology of these fibers is identical to that previously described in Chapter II for fibers of cellulose derivatives having a degree of substitution DS in formate groups greater than or equal to 2%.

The process of the invention which has been previously described for producing fibers of regenerated cellulose unexpectedly makes it possible to have a combination of the following advantages:

direct, rapid and inexpensive dissolving of cellulose without starting from a derivative of cellulose in order to produce the spinnable solution;

use of inexpensive and non-toxic products as agents for the dissolving of the cellulose;

little degradation of the cellulose upon the dissolving thereof;

easy regeneration of the spun articles;

obtaining of fibers of regenerated cellulose which are characterized surprisingly by the combination of two factors, namely high tenacity and high modulus.

Preferably, in the fibers of regenerated cellulose according to the invention, the degree of substitution DS of the cellulose in ester groups other than formate is zero or less than 1.5%.

Preferably in the fibers of regenerated cellulose according to the invention, the DP of the cellulose is at least equal to 200 and at most equal to 1200.

Of course, the invention is not limited to the examples described above. Thus, in particular, the compositions according to the invention may include materials other than those described, for instance pigments, fillers, and polymers other than cellulose which are possibly capable of being esterified during the production of the composition. In this case, preferably, in the process of dissolving in accordance with the invention, one prepares a mixture prepared essentially from the base materials previously described, and the compositions according to the invention have essentially the constitution described above. The invention also covers cases in which the compositions and articles comprise a mixture of cellulose derivatives.

We claim:

1. A composition having a base of at least one cellulose derivative containing cellulose ester groups, at least a part of these ester groups being formate groups, such that it is an anisotropic solution which can give fibers or films and comprises:
    (a) a cellulose derivative or derivatives, the concentration of the cellulose derivative or of all of the cellulose derivatives in the solution being at least equal to 10.2% by weight, the degree of polymerization DP of the cellulose in the cellulose derivative or derivatives being greater than 150 and less than 1500 and the degree of substitution DS of the cellulose in ester groups other than formate of the cellulose derivative or derivatives being zero or less than 15%;
    (b) an organic acid phase of formic acid or at least two compounds selected from the group consisting of monocarboxylic organic acids and the anhydrides and halides of these acids, one of these compounds being formic acid; and
    (c) a phosphoric acid phase of at least one phosphoric acid, or at least one phosphoric acid and phosphoric anhydride.

2. A composition according to claim 1, characterized by the fact that the degree of polymerization DP of the cellulose in the cellulose derivative or derivatives is at least equal to 200 and at most equal to 1200 and provided with the following features:

the percentages by weight $r_I$, $r_{II}$, $r_{III}$, $r_w$ are defined by the following relationships:

$r_I$: percentage of the cellulose derivative or derivatives;

$r_{II}$: percentage of the said organic acid phase, this phase comprising all the organic acids, organic acid anhydrides and organic acid halides present in the composition;

$r_{III}$: percentage of the said phosphoric acid phase, this phase comprising the phosphoric acids and the phosphoric anhydride which are present in the composition;

$r_w$: percentage of water present in the composition, these percentages being calculated on the total weight = weight of the cellulose derivative or derivatives+weight of the said organic acid phase+weight of the said phosphoric acid phase+weight of any water, these percentages $r_I$, $r_{II}$, $r_{III}$, $r_w$ making it possible to define a quaternary diagram with the relationship $$r_I + r_{II} + r_{III} + r_2 = 1;$$

the values of $r_w$ are distributed in intervals; in each interval one has $r_{wi} \leq r_w < r_{wj}$, in which $r_{wi}$ and $r_{wj}$ are fixed values; for each value $r_{wi}$, one has a relationship $r_I + r_{II} + r_{III} = 1 - r_{wi}$; a polygon comprising a number of vertices which may vary from one interval to the next, each of these vertices being designated generally as $C_k$ wherein k is a variable, is defined by its coordinates $r_{Ik}$, $r_{IIk}$, $r_{IIIk}$ in a ternary diagram corresponding to the value $r_{wi}$, said ternary diagram lying in a plane $r_{wi}$, said coordinates $r_{Ik}$, $r_{IIk}$, $r_{IIIk}$ verifying the above mentioned relationship $r_I + r_{II} + r_{III} = 1 - r_{wi}$;

in each interval $r_{wi} \leq r_w < r_{wj}$, every point of the quaternary diagram of coordinates $r_I$, $r_{II}$, $r_{III}$, $r_w$ corresponding to a composition according to claim 1 is projected onto said plane $r_{wi}$ and perpendicular to this plane, within the polygon of vertices $C_k$ or on the sides of this polygon;

these intervals $r_{wi} \leq r_w < r_{wj}$ and these polygons of vertices $C_k$ are given by the following relationships, the values of $r_{wi}$, $r_w$, $r_{wj}$ and the values of the coordinates of the vertices $C_k$ being expressed in %:

for $0.0 \leq r_w < 1.4$, this polygon is a hexagon of vertices:

$C_1$ ($r_{I1} = 11.5$, $r_{II1} = 1.9$, $r_{III1} = 86.6$)
$C_2$ ($r_{I2} = 35.5$, $r_{II2} = 0.4$, $r_{III2} = 64.1$)
$C_3$ ($r_{I3} = 37.3$, $r_{II3} = 4.7$, $r_{III3} = 58.0$)
$C_4$ ($r_{I4} = 24.9$, $r_{II4} = 27.8$, $r_{III4} = 47.3$)
$C_5$ ($r_{I5} = 18.7$, $r_{II5} = 28.9$, $r_{III5} = 52.4$)
$C_6$ ($r_{I6} = 12.5$, $r_{II6} = 14.9$, $r_{III6} = 72.6$)

for $1.4 \leq r_w < 3.8$, this polygon is a hexagon of vertices:

$C_1$ ($r_{I1} = 11.0$, $r_{II1} = 2.4$, $r_{III1} = 85.2$)
$C_2$ ($r_{I2} = 35.8$, $r_{II2} = 0.3$, $r_{III2} = 62.5$)
$C_3$ ($r_{I3} = 37.8$, $r_{II3} = 9.4$, $r_{III3} = 51.4$)
$C_4$ $r_{I4} = 27.5$, $r_{II4} = 27.6$, rHD III4 = 43.5)
$C_5$ ($r_{I5} = 18.3$, $r_{II5} = 29.6$, $r_{III5} = 50.7$)
$C_6$ ($r_{I6} = 12.5$, $r_{II6} = 14.8$, $r_{III6} = 71.3$)

for $3.8 \leq r_w < 6.2$, this polygon is a hexagon of vertices:

$C_1$ ($r_{I1} = 11.8$, $r_{II1} = 2.4$, $r_{III1} = 82.0$)
$C_2$ ($r_{I2} = 34.0$, $r_{II2} = 0.7$, $r_{III2} = 61.5$)
$C_3$ ($r_{I3} = 36.6$, $r_{II3} = 7.4$, $r_{III3} = 52.2$)
$C_4$ ($r_{I4} = 23.9$, $r_{II4} = 24.4$ $r_{III4} = 47.9$)
$C_5$ ($r_{I5} = 20.7$, $r_{II5} = 24.8$, $r_{III5} = 50.7$)
$C_6$ ($r_{I6} = 13.2$, $r_{II6} = 11.9$, $r_{III6} = 71.1$)

for $6.2 \leq r_w < 8.6$, this polygon is a pentagon of vertices:

$C_1$ ($r_{I1} = 13.1$, $r_{II1} = 1.4$, $r_{III1} = 79.3$)
$C_2$ ($r_{I2} = 29.1$, $r_{II2} = 1.4$, $r_{III2} = 63.3$)
$C_3$ ($r_{I3} = 31.1$, $r_{II3} = 5.6$, $r_{III3} = 57.1$)
$C_4$ ($r_{I4} = 22.7$, $r_{II4} = 18.7$, $r_{III4} = 52.4$)
$C_5$ ($r_{I5} = 13.3$, $r_{II5} = 10.1$, $r_{III5} = 70.4$).

3. A composition according to claim 2, wherein in each interval $r_{wi} < r_w \leq r_{wj}$ for each value of $r_{wj}$, one has a relationship $r_I + r_{II} + r_{III} = 1 - r_{wj}$; a polygon comprising a number of vertices which may vary from on interval to the next, each of these vertices being referenced in general as $C_q$ wherein q is a variable is defined by its coordinates $r_{Iq}$, $r_{IIq}$, $r_{IIIq}$ in a ternary diagram corresponding to the value $r_{wj}$, said ternary diagram lying in a plane $r_{wj}$, said coordinates $r_{Iq}$, $r_{IIq}$, $r_{IIIq}$ verifying the above mentioned relationship $r_I + r_{II} + r_{III} = 1 - r_{wj}$; in each interval $r_{wi} < r_w \leq r_{wj}$, every point of the quaternary diagram of coordinates $r_I$, $r_{II}$, $r_{III}$, $r_w$ corresponding to a composition is projected onto the plane $r_{wj}$ and perpendicular to said plane within the polygon of vertices $C_q$ or on the sides of this polygon, these intervals $r_{wi} < r_w \leq r_{wj}$ and these polygons of vertices $C_q$ are given by the following relationships, the values of $r_{wi}$, $r_w$, $r_{wj}$ and the values of the coordinates of the vertices $C_1$ being expressed in %:

for $0.0 < r_w \leq 1.4$, this polygon is a hexagon of vertices:

$C_1$ ($r_{I1} = 11.0$, $r_{II1} = 2.4$, $r_{III1} = 85.2$)
$C_2$ ($r_{I2} = 35.8$, $r_{II2} = 0.3$, $r_{III2} = 62.5$)
$C_3$ ($r_{I3} = 37.8$, $r_{II3} = 9.4$, $r_{III3} = 51.4$)
$C_4$ ($r_{I4} = 27.5$, $r_{II4} = 27.6$, $r_{III4} = 43.5$)
$C_5$ ($r_{I5} = 18.3$, $r_{II5} = 29.6$, $r_{III5} = 50.7$)
$C_6$ ($r_{I6} = 12.5$, $r_{II6} = 14.8$, $r_{III6} = 71.3$)

for $1.4 < r_w \leq 3.8$, this polygon is a hexagon of vertices:

$C_1$ ($r_{I1} = 11.8$, $r_{II1} = 2.4$, $r_{III1} = 82.0$)
$C_2$ ($r_{I2} = 34.0$, $r_{II2} = 0.7$, $r_{III2} = 61.5$)
$C_3$ ($r_{I3} = 36.6$, $r_{II3} = 7.4$, $r_{III3} = 52.2$)
$C_4$ ($r_{I4} = 23.9$, $r_{II4} = 24.4$, $r_{III4} = 47.9$)
$C_5$ ($r_{I5} = 20.7$, $r_{II5} = 24.8$, $r_{III5} = 50.7$)
$C_6$ ($R_{I6} = 13.2$, $r_{II6} = 11.9$, $r_{III6} = 71.1$)

for $38 < r_w \leq 6.2$, this polygon is a pentagon of vertices:

$C_1$ ($r_{I1} = 13.1$, $r_{II1} = 1.4$, $r_{III1} = 79.3$)
$C_2$ $r_{I2} = 29.1$, $r_{II2} = 1.4$, $r_{III2} = 63.3$)
$C_3$ ($r_{I3} = 31.1$, $r_{II3} = 5.6$, $r_{III3} = 57.1$)
$C_4$ ($r_{I4} = 22.7$, $r_{II4} = 18.7$, $r_{III4} = 52.4$)
$C_5$ ($r_{I5} = 13.3$, $r_{II5} = 10.1$, $r_{III5} = 70.4$).

4. A method of obtaining a composition according to any of claims 1, 2 or 3, comprising the following features:

(a) a mixture is formed from at least three materials, namely:

(I) a cellulose material;

(II) a material consisting of at least one compound selected from the group consisting of monocarboxylic organic acids and the anhydrides and halides of these acids, this material consisting at least in part of a material selected from the group consisting of formic acid, an anhydride of formic acid and another organic acid and, combinations thereof;

(III) a material consisting of phosphoric anhydride or at least one phosphoric acid, or of phosphoric anhydride and at least one phosphoric acid;

(b) the amount of water present to form the mixture is zero or such that the ratio $$R_{wr} = \frac{P_w - P_{wr}}{P_I + P_{II} + P_{III} + P_w - P_{wr}}$$

is less than 15.0% and greater than $-7.5\%$, $P_w$ being the weight of water present, $P_{wr}$ being the weight of water capable of reacting with a material selected from the group consisting of material (II), material (III), and combinations thereof, $P_I$ being the weight of cellulose in material (I), $P_{II}$ being the weight of material (II) and $P_{III}$ being the weight of the material (III);

(c) the ratios $R_I$, $R_{II}$, $R_{III}$ being defined by:

$$R_I = \frac{P_I}{P_I + P_{II} + P_{III} + P_w - P_{wr}},$$

$$R_{II} = \frac{P_{II}}{P_I + P_{II} + P_{III} + P_w - P_{wr}}$$

$$R_{III} = \frac{P_{III}}{P_I + P_{II} + P_{III} + P_w - P_{wr}}$$

the ratios $R_I$, $R_{II}$, $R_{III}$, $R_{wr}$, the sum of which $R_I + R_{II} + R_{III} + R_{wr}$ is equal by definition to 100%, will verify the following relationships the values of which, expressed in % are:
if $R_{wr}$ verifies the relationship:
$12.5 \leq R_{wr} < 15.0$
one has the relationships:
  $10.0 \leq R_1 \leq 14.5$; $2.0 \leq R_{II} \leq 10.0$
with the relationship: $R_{II} \leq 0.89\ R_I - 2.89$;
if $R_{wr}$ verifies the relationship:
$10.0 \leq R_{wr} < 12.5$
one has the relationships;
  $10.0 \leq R_I \leq 19.5$; $2.0 \leq R_{II} \leq 17.0$
with the relationship: $R_{II} \leq 1.78\ R_I - 8.78$
  if $R_I$ verifies the relationship: $R_I < 14.5$
or with the relationship:
  $R_{II} \leq -1.40\ R_I + 37.30$
  if $R_I$ verifies the relationship: $R_I \geq 14.5$;
if $R_{wr}$ verifies the relationship:
$7.5 \leq R_{wr} < 10.0$
one has the relationships:
  $10.0 \leq R_I \leq 31.0$; $2.0 \leq R_{II} \leq 23.0$
with the relationship: $R_{II} \leq 4.40\ R_I - 32.00$
  if $R_I$ verifies the relationship $R_I \leq 12.5$,
or with the relationship:
  $R_{II} \leq -1.19\ R_I + 41.50$
  if $R_I$ verifies the relationship: $R_I \geq 15.5$;
if $R_{wr}$ verifies the relationship:
$5.0 \leq R_{wr} < 7.5$
one has the relationships:
  $10.0 \leq R_I \leq 37.0$; $2.0 \leq R_{II} \leq 27.5$
with the relationship: $R_{II} \leq 4.17\ R_I - 26.67$
  if $R_I$ verifies the relationship: $R_I \leq 13.0$,
or with the relationship:
  $R_{II} \leq -1.14\ R_I + 49.14$
  if $R_I$ verifies the relationship: $R_I \geq 19.0$;
if $R_{wr}$ verifies the relationship:
$2.5 \leq R_{wr} < 5.0$
one has the relationships:
  $10.0 \leq R_I \leq 37.0$; $2.0 \leq R_{II} \leq 36.5$
with the relationship: $R_{II} \leq 4.63\ R_I - 28.25$
  if $R_I$ verifies the relationship: $R_I \leq 14.0$,
or with the relationship:
  $R_{II} \leq 1.23\ R_I + 55.60$
  if $R_I$ verifies the relationship: $R_I \geq 15.5$;
if $R_{wr}$ verifies the relationship:
$-2.5 < R_{wr} < 2.5$
one has the relationships:
  $10.0 \leq R_I \leq 38.0$  $2.0 \leq R_{II} \leq 40.0$
with the relationship: $R_{II} \leq 2.80\ R_I + 5.00$
  if $R_I$ verifies the relationship: $R_I \leq 12.5$,
or with the relationship:
  $R_{II} \leq -1.14\ R_I + 62.14$
  if $R_I$ verifies the relationship; $R_I \geq 19.5$;
if $R_{wr}$ verifies the relationship:
$-5.0 < R_{wr} \leq -2.5$
one has the relationships:
  $10.0 \leq R_I \leq 35.0$; $2.0 \leq R_{II} \leq 45.0$ with the relationship: $R_{II} \leq -1.30\ R_I + 64.50$;
if $R_{wr}$ verifies the relationship:
  $-7.5 < R_{wr} \leq -5.0$
one has the relationships:
  $10.0 \leq R_I \leq 32.0$; $2.0 \leq R_{II} \leq 36.0$
with the relationship: $R_{II} \leq 4.00\ R_I - 22.00$
  if $R_I$ verifies the relationship: $R_I \leq 14.5$;
(d) the degree of polymerization DP of the cellulose of material (I) is greater than 150 and less than 1500;
(e) the esterification of the cellulose is allowed to proceed in this mixture for a period of time sufficient to obtain said anisotropic solution.

5. A method according to claim 4, wherein the cellulose of cellulose material (I) has a degree of polymerization DP at least equal to 200 and at most equal to 1200 and one has the following relationships between $R_I$, $R_{II}$, $R_{III}$, $R_{wr}$ the values of which are expressed in %:
If $R_{wr}$ verifies the relationship: $10.0 \leq L\ R_{wr} < 12.5$
  one has the relationships:
    $13.0 \leq R_I \leq 19.0$; $4.0 \leq R_{II} \leq 11.0$
  with the relationship:
    $R_{II} \leq 0.73\ R_I - 2.45$
    if $R_I$ verifies the relationship: $R_I < 18.5$,
  or with the relationship:
    $R_{II} \leq -2.00\ R_I + 48.00$
    if $R_I$ verifies the relationship: $R_I \geq 18.5$;
If $R_{wr}$ verifies the relationship: $7.5 \leq R_{wr} < 10.0$
  one has the relationships:
    $12.25 \leq R_I \leq 23.0$; $4.0 \leq R_{II} \leq 19.5$
  with the relationship:
    $R_{II} \leq 1.65\ R_I - 10.24$
    if $R_I$ verifies the relationship: $R_I < 18.0$,
  or with the relationship:
    $R_{II} \leq -1.40\ R_I + 44.70$
    if $R_I$ verifies the relationship: $R_I \geq 18.0$;
If $R_{wr}$ verifies the relationship: $5.0 \leq R_{wr} < 7.5$
  one has the relationships:
    $11.5 \leq R_I \leq 27.5$; $4.0 \leq R_{II} \leq 24.0$
  with the relationship:
    $R_{II} \leq 1.38\ R_I - 2.81$
    if $R_I$ verifies the relationship: $R_I < 19.5$,
  or with the relationship:
    $R_{II} \leq -1.56\ R_I + 54.47$
    if $R_I$ verifies the relationship: $R_I \geq 19.5$;
If $R_{wr}$ verifies the relationship: $2.5 \leq R_{wr} < 5.0$
  one has the relationships:
    $10.75 \leq R_I \leq 32.0$; $4.0 \leq R_{II} \leq 30.0$
  with the relationship:
    $R_{II} \leq 2.07\ R_I - 5.80$
    if $R_I$ verifies the relationship: $R_I \leq 17.5$,
  or with the relationship:
    $R_{II} \leq -1.30\ R_I + 56.74$
    if $R_I$ verifies the relationship: $R_I \geq 20.5$;
If $R_{wr}$ verifies the relationship: $-2.5 < R_{wr} < 2.5$
  one has the relationships:
    $10.0 \leq R_I \leq 33.5$; $4.0 \leq R_{II} \leq 35.0$
  with the relationship:
    $R_{II} \leq 3.20\ R_I - 13.00$
    if $R_I$ verifies the relationship: $R_I \leq 15.0$,
  or with the relationship:
    $R_{II} \leq -1.76\ R_I + 75.52$
    if $R_I$ verifies the relationship: $R_I \geq 23.0$;
If $R_{wr}$ verifies the relationship: $-5.0 < R_{wr} \leq -2.5$
  one has the relationships:
    $10.0 \leq R_I \leq 33.5$; $4.0 \leq R_{II} \leq 35.0$
  with the relationship:
    $R_{II} = 3.20\ R_I - 13.0$ if $R_I$ verifies the relationship: $R_I \leq 15.0$,
or with the relationship:
$$R_{II} \leq -1.85\ R_I + 72.85$$
if $R_I$ verfies the relationship: $R_I \geq 20.5$.

6. A method according to claim 5, wherein one has the following relationships between $R_I$, $R_{II}$, $R_{III}$, $R_{wr}$, the values of which are expressed in %:

If $R_{wr}$ verifies the relationship: $7.5 < R_{wr} \leq 10.0$
one has the relationships:
$13.0 \leq R_I \leq 19.0$; $4.0 \leq R_{II} \leq 11.0$
with the relationship:
$$R_{II} \leq 0.73\ R_I - 2.45,$$
if $R_I$ verifies the relationship: $R_I < 18.5$
or with the relationship:
$$R_{II} \leq 2.00\ R_I + 48.00$$
if $R_I$ verifies the relationship: $R_I \geq 18.5$;

If $R_{wr}$ verifies the relationship: $5.0 < R_{wr} \leq 7.5$
one has the relationships:
$12.25 \leq R_I \leq 23.0$; $4.0 \leq R_{II} \leq 19.5$
with the relationship:
$$R_{II} \leq 1.65\ R_I - 10.24$$
if $R_I$ verifies the releationship: $R_I < 18.0$,
or with the relationship:
$$R_{II} \leq -1.40\ R_I + 44.70$$
if $R_I$ verifies the relationship: $R_I \geq 18.0$;

If $R_{wr}$ verifies the relationship: $2.5 < R_{wr} \leq 5.0$
one has the relationships:
$11.5 \leq R_I \leq 27.5$; $4.0 \leq R_{II} \leq 24.0$
with the relationship:
$$R_{II} \leq 1.38\ R_I - 2.81$$
if $R_I$ verifies the relationship: $R_I < 19.5$,
or with the relationship:
$$R_{II} \leq -1.56\ R_I + 54.47$$
if $R_I$ verifies the relationship: $R_I \geq 19.5$;

If $R_{wr}$ verifies the relationship: $0.0 < R_{wr} \leq 2.5$
one has the relationships:
$10.75 \leq R_I \leq 32.0$; $4.0 \leq R_{II} \leq 30.0$
with the relationship:
$$R_{II} \leq 2.07\ R_I - 5.80$$
if $R_I$ verifies the relationship: $R_I \leq 17.5$,
or with the relationship:
$$R_{II} \leq -1.30\ R_I + 56.74$$
if $R_I$ verifies the relationship: $R_I \geq 20.5$;

If $R_{wr}$ verifies the relationship: $-2.5 \leq R_{wr} \leq 0.0$
one has the relationships:
$10.0 \leq R_I \leq 33.5$; $4.0 \leq R_{II} \leq 35.0$
with the relationship:
$$R_{II} \leq 3.20\ R_I - 13.00$$
if $R_I$ verifies the relationship: $R_I \leq 15.0$,
or with the relationship:
$$R_{II} \leq -1.85\ R_I + 72.85$$
if $R_I$ verifies the relationship: $R_1 \geq 0.5$.

7. A method of obtaining an article having a base of at least one cellulose derivative, from the composition according to any of claims 1, 2 or 3, in which sad composition is transformed into an article and at least a part of the products other than the cellulose derivative or derivatives is eliminated.

8. A method according to claim 7, wherein a coagulation bath is used upon the transformation of the composition.

9. A method according to claim 8, wherein the coagulation bath has a base of acetone.

10. A method according to claim 8, wherein the temperature of the bath is at least equal to $-20°$ and at most equal to $10°$ C.

11. A method according to claim 7, wherein dry jet-wet spinning with non-coagulant fluid space is used.

12. A method according to claim 1, wherein the cellulose of sid article is at least partly regenerated.

13. A method according to claim 12, wherein the regeneration is effected with an aqueous alkaline solution.

14. An article obtained by the method according to claim 7, in which it is a fiber or a film.

15. A fiber formed at least in part of a filament having a base of at least one cellulose derivative containing cellulose ester groups, at least a part of these ester groups formate groups, comprising the following properties:
  (a) the degree of substitution DS of the cellulose by formate groups is at least equal to 2%, the degree of substitution DS of the cellulose in other ester groups is zero or less than 10% and the degree of polymerization DP of the cellulose is greater than 150 and less than 1500;
  (b) the tenacity T and the initial modulus $M_i$ of the fiber verify the following relationships, T and $M_i$ being expressed in cN/tex: $T > 20$; $M_i > 1000$;
  (c) this filament has a morphology such that it is formed at least in part by layers embedded in each other, these layers surrounding the axis of the filament, and such that in each layer the optical direction and the direction of crystallization vary pseudoperiodically along the axis of the filament.

16. A fiber according to claim 15, in which said fiber has no effect from drawing other than that resulting from its shaping.

17. A fiber according to either of claim 15 or claim 16, in which its double refraction $\Delta n$ is greater than 0.03.

18. A fiber according to claim 15, in which the degree of polymerization DP of the cellulose in the cellulose derivative or derivatives is at least equal to 200 and at most equal to 1200.

19. A fiber formed at least in part of a filament having a base of cellulose or of at least one cellulose derivative containing cellulose ester groups, at least a part of these ester groups being formate groups, comprising the following properties:
  (a) the degree of substitution DS of the cellulose by formate groups is zero or less than 2%, the degree of substitution DS of the cellulose in ester groups other than formate is zero or less than 1.5% and the degree of polymerization DP of the cellulose is greater than 150 and less than 1500;
  (b) the degree of polymerization DP of the cellulose, the tenacity T and the initial modulus $M_i$ of the fiber verify the following relationships, T and $M_i$ being expressed in cN/tex:
  for $DP < 200$, one has $T > 20$ and $M_i > 1800$;
  for $200 \leq DP < 300$, one has $T > 30$ and $M_i > 2000$;
  for $300 \leq DP < 400$, one has $T >'$ and $M_i > 2400$;
  for $400 \leq DP < 1500$, one has $T > 60$ and $M_i > 2600$;
  (c) this filament has a morphology such that it is formed at least in part by layers which are embedded in each other, these layers surrounding the axis of the filament, and such that in each layer the optical direction and the direction of crystallization vary pseudoperiodically along the axis of the filament.

20. A fiber according to claim 19, in which DP, T and $M_i$ verify the following relationships, T and $M_i$ being expressed in cN/tex: for $150 < DP < 250$, one has $T \geq \frac{1}{5} DP - 26$ and $M_i \geq 2300$; for $250 \leq DP < 1500$, one has $T \geq -18675/DP + 132$ and $M_i \geq -502250/DP + 4309$.

21. A fiber according to either of claim 19 or claim 20, in which its sonic modulus $M_s$ verifies the relationship $M_s > 3000$ cN/tex.

22. A fiber according to either claim 19 or claim 20, in which its index of orientation I.O. verifies the relationship I.O. $> 95.5\%$.

23. A fiber according to either claim 19 or claim 20, in which said fiber has no effect from drawing other than that resulting from its shaping.

24. A fiber according to claim 19, in which the degree of polymerization DP of the cellulose which it contains is at least equal to 200 and at most equal k to 1200.

* * * * *

UNITED STATES PATENT AND TRADEMARK OFFICE
CERTIFICATE OF CORRECTION

PATENT NO. : 4,839,113

DATED : June 13, 1989

INVENTOR(S) : Villaine et al.

It is certified that error appears in the above-identified patent and that said Letters Patent is hereby corrected as shown below:

First page, first line of Item 54, and col. 1, line 1, "ANISTROPIC" should read --ANISOTROPIC--;

Col. 1, line 9, "Cellulose" should read --cellulose--;

Col. 1, line 34, "by" should read --be--;

Col. 2, line 11, "solutionsof" should read --solutions of--;

Col. 2, line 32, "leat" should read --least--;

Col. 2, line 50, "affected" should read -- effected --.

Col. 2, line 54, "(a)" should read --(a) a--;

Col. 4, line 32, "a least" should read --at least--;

Col. 6, line 28, "in" should read --In--;

Col. 8, line 7, after "intrinsic" insert --viscosity--;

Col. 8, line 10, "$KM_w^{60}$" should read --$K\overline{M}_w^{\alpha}$--;

UNITED STATES PATENT AND TRADEMARK OFFICE
CERTIFICATE OF CORRECTION

PATENT NO. : 4,839,113
DATED : June 13, 1989
INVENTOR(S) : Villaine et al.

It is certified that error appears in the above-identified patent and that said Letters Patent is hereby corrected as shown below:

Col. 13, 11th and 9th-lines-from bottom of TABLE 2, "phorphorus" should read -- phosphorus --.

Col. 21, TABLE 11, 4th-from bottom line, figures on this line should be moved up one line to be opposite "Formate groups";

Col. 25, line 27, "follow" should read -- follows --.

Col. 30, line 58, "32" should read -- = --;

Col. 33, line 44, "yarns" should read --yarn--;

Col. 34, line 20, "KB" should read --$K^{\beta}$--;

Col. 35, line 13, "($\Delta P$)" should read --($\Delta \gamma$)--

Col. 36, line 45, "coresponding" should read --corresponding--;

Col. 38, line 37, "meters/minutes" should read --meters/minute--;

Col. 38, line 66, "Examples" should read --Example--;

UNITED STATES PATENT AND TRADEMARK OFFICE
CERTIFICATE OF CORRECTION

PATENT NO. : 4,839,113

DATED : June 13, 1989

INVENTOR(S) : Villaine et al.

It is certified that error appears in the above-identified patent and that said Letters Patent is hereby corrected as shown below:

Col. 39, line 35, "$R_{wr}=1.4\%$" should read --$R_{wr}=R_w=1.4\%$--;

Col. 39, line 42, "Ii-1" should read --II-1--;

Col. 40, line 32, "characteristics" should read --characteristic--;

Col. 43, line 38, "then" should read --the--;

Col. 44, line 60, "$R_{wr}=R_w-1.08\%$" should read --$R_{wr}=R_w=1.0\%$--;

Col. 49, line 5, that portion of the equation reading "$r_2$" should read --$r_w$--;

Col. 49, line 43, "$r_{I4}$" should read --($r_{I4}$-- and "rHD III4" should read --$r_{III4}$--;

Col. 49, line 64, "on" should read --one--;

Col. 49, line 66, after "variable" insert --and--;

Col. 50, line 10, "$C_1$" should read --$C_q$--;

Col. 50, line 29, "38" should read --3.8--;

UNITED STATES PATENT AND TRADEMARK OFFICE
CERTIFICATE OF CORRECTION

PATENT NO. : 4,839,113
DATED : June 13, 1989
INVENTOR(S) : Villaine et al.

It is certified that error appears in the above-identified patent and that said Letters Patent is hereby corrected as shown below:

Col. 50, line 32, "$r_{I2}$" should read --$(r_{I2}$--;

Col. 50, line 49, "and, combinations" should read --, and combinations--;

Col. 51, line 59, "38.0" should read --38.0;--;

Col. 52, line 7, "vertifies" should read --verifies--;

Col. 52, line 68, "$R_{II}=3.20$" should read --$R_{II} \leq 3.20$--;

Col. 53, line 15, "2.00" should read -- - 2.00--;

Col. 53, line 52, "0.5" should read --20.5--;

Col. 53, line 55, "sad" should read --said--;

Col. 54, line 1, "claim 1" should read --claim 7--;

Col. 54, line 2, "sid" should read --said--;

Col. 54, line 11, "formate" should read -- being formate--;

UNITED STATES PATENT AND TRADEMARK OFFICE
CERTIFICATE OF CORRECTION

PATENT NO. : 4,839,113

DATED : June 13, 1989

INVENTOR(S) : Villaine et al.

It is certified that error appears in the above-identified patent and that said Letters Patent is hereby corrected as shown below:

Col. 54, line 56, "T >" should read --T > 40--;

Col. 56, line 8, "equal k" should read --equal--.

Signed and Sealed this

Thirteenth Day of February, 1990

Attest:

JEFFREY M. SAMUELS

Attesting Officer   Acting Commissioner of Patents and Trademarks